United States Patent
Klenner et al.

(10) Patent No.: US 10,605,054 B2
(45) Date of Patent: Mar. 31, 2020

(54) SYSTEM AND METHOD FOR GENERATING A SCHEDULE TO EXTRACT A RESOURCE FROM A RESERVOIR

(71) Applicant: General Electric Company, Schenectady, NY (US)

(72) Inventors: Robert Carl Lloyd Klenner, Oklahoma City, OK (US); Eric Robertson, Oklahoma City, OK (US); Guoxiang Liu, Oklahoma City, OK (US); Naresh Sundaram Iyer, Schenectady, NY (US); Steven Hector Azzaro, Oklahoma City, OK (US)

(73) Assignee: General Electric Co., Schenectady, NY (US)

( * ) Notice: Subject to any disclaimer, the term of this patent is extended or adjusted under 35 U.S.C. 154(b) by 24 days.

(21) Appl. No.: 15/433,086

(22) Filed: Feb. 15, 2017

(65) Prior Publication Data
US 2018/0230780 A1    Aug. 16, 2018

(51) Int. Cl.
*E21B 41/00* (2006.01)
*G05B 19/418* (2006.01)
(Continued)

(52) U.S. Cl.
CPC ........ *E21B 41/0092* (2013.01); *E21B 43/121* (2013.01); *E21B 43/26* (2013.01);
(Continued)

(58) Field of Classification Search
CPC .... E21B 41/0092; E21B 43/121; E21B 43/26; E21B 47/06; E21B 47/04; G05B 2219/45129; G05B 19/41865
See application file for complete search history.

(56) References Cited

U.S. PATENT DOCUMENTS

| 8,244,509 B2 | 8/2012 | Banerjee et al. |
| 8,274,399 B2 | 9/2012 | Strachan et al. |

(Continued)

FOREIGN PATENT DOCUMENTS

| WO | 2012090175 A2 | 7/2012 |
| WO | 2015/019112 A3 | 2/2015 |

(Continued)

OTHER PUBLICATIONS

International Search Report and Written Opinion issued in connection with corresponding PCT Application No. PCT/US2018/017767 dated Jul. 25, 2018.

*Primary Examiner* — Brad Harcourt
(74) *Attorney, Agent, or Firm* — Laura L. Pollander

(57) ABSTRACT

A system includes a schedule generator having one or more processors configured to obtain resource extraction parameters for extracting a resource from a reservoir. The resource extraction parameters include well creation parameters associated with drilling wellbores, well stimulation parameters associated with introducing fracturing fluid into the wellbores, and production parameters associated with extracting the resource through the wellbores. The schedule generator selects initial trial schedules having different values of the resource extraction parameters and receives initial resource output data generated by execution of the initial trial schedules with a designated reservoir model. The schedule generator generates a surrogate model based on the initial resource output data and the initial trial schedules and uses the surrogate model to perform iterations of selecting modified trial schedules until a predetermined condition is satisfied.

20 Claims, 8 Drawing Sheets

(51) Int. Cl.
*E21B 43/26* (2006.01)
*E21B 43/12* (2006.01)
E21B 47/06 (2012.01)
E21B 47/04 (2012.01)

(52) U.S. Cl.
CPC ........ *G05B 19/41865* (2013.01); *E21B 47/04* (2013.01); *E21B 47/06* (2013.01); *G05B 2219/45129* (2013.01); *Y02P 90/02* (2015.11)

(56) References Cited

U.S. PATENT DOCUMENTS

| | | |
|---|---|---|
| 8,813,840 B2 | 8/2014 | Zupanick |
| 8,949,098 B2 | 2/2015 | King |
| 2002/0177955 A1 | 11/2002 | Jalali et al. |
| 2013/0118736 A1 | 5/2013 | Usadi et al. |
| 2013/0231901 A1 | 9/2013 | Lu et al. |
| 2015/0057934 A1 | 2/2015 | Ma et al. |
| 2015/0354336 A1 | 12/2015 | Maurice et al. |
| 2016/0069169 A1 | 3/2016 | Iyer et al. |
| 2016/0098502 A1 | 4/2016 | Havre et al. |
| 2016/0186496 A1 | 6/2016 | De Bakker et al. |
| 2016/0357887 A1 | 12/2016 | Ortiz et al. |

FOREIGN PATENT DOCUMENTS

| | | |
|---|---|---|
| WO | 2015137943 A1 | 9/2015 |
| WO | 2015138724 A1 | 9/2015 |
| WO | 2016032489 A1 | 3/2016 |

FIG. 4

| | Parameter abbreviation | Parameter name | Min | Max | Discrete # | Description of parameter |
|---|---|---|---|---|---|---|
| A | $t_{is}$ | Time infill start (days) | 0 | 365 | | Time to start infill drilling |
| B | $t_{id}$ | Time between infills (days) | 0 | 90 | | Time between infills |
| C | $B_{max}$ | BHFP max (psi) | 300 | 3500 | | BHFP starting value (same for each well) |
| D | S | Sequence | | | 3 | Running sequence, middle-out, out-middle |
| E | n | Number of stages | 20 | 50 | | Amount of fracture stages in a well |
| F | F | Fracture design | | | 3 | 3 fracture geometries (Hf=500, 1000, 1500) |
| G | W | Number of wells | 1 | 7 | | Number of wells to infill |
| H | r | BHFP step rate (days) | 4 | 90 | | Step rate to adjust BHFP |
| I | $B_{min}$ | BHFP min (psi) | 300 | 3500 | | Minimum BHFP |
| J | Π | Family of curve | 0.0 | 4.0 | | Curve family to taper BHFP |

FIG. 6

SYSTEM AND METHOD FOR GENERATING A SCHEDULE TO EXTRACT A RESOURCE FROM A RESERVOIR

FIELD

Embodiments of the subject matter described herein relate to systems and methods that extract resources from subterranean reservoirs.

BACKGROUND

The removal of resources, such as oil, natural gas, and other hydrocarbons, from a subterranean reservoir may be assisted by creating a zone of fractures in the rock around a wellbore to allow the hydrocarbon resources to flow through the fractures to the wellbore in a process commonly called hydraulic fracturing stimulation. The hydraulic fracturing process involves injecting a fracturing fluid including water, proppant particles (e.g., sand), and chemicals into wellbores under high pressure. The fracturing fluid penetrates small cracks and natural fractures in the reservoir and causes larger fractures emanating from the wellbores. Hydraulic fracturing can be used to extract hydrocarbon resources from shale rock, coal beds, and other hard, low-permeability subterranean layers from which it was previously considered difficult, if not impossible, to extract hydrocarbon resources.

Effective use of hydraulic fracturing involves well design, fracture design, and dynamic fluid production design over an operational lifetime of a well pad (from which the wellbores are drilled). Inappropriately designed hydraulic fracturing designs, well drilling plans, or production schedules can result in poor resource production, such as flow rate and cumulative amount of the resource extracted, and a reduced net worth or present value of the well pad lease. The poor resource production may be due to well communication or poor contact with the reservoir. A development fracturing design and schedule more customized to the reservoir and generated using a better design process can result in better resource production and a greater new worth or present value of the well pad lease relative to the inappropriately designed drilling plans and production schedules. Presently, development design and production schedules for hydraulic fractured-based resource production require a significant amount of time to develop. In addition, some operators have attempted to increase productivity of the asset or well pad by increasing the density of wells in an area by downspacing (reducing the spacing) between wells in a newly purchased lease or drilling additional wells in current existing leases. But, increasing the well density may cause the wells to interact in the subsurface, resulting in a less than optimal resource output that does not justify the cost of drilling additional wells. Furthermore, present methods of generating extraction schedules may not consider the entire operational lifetime of the well pad, so the extraction schedules may become stale (e.g., less relevant and accurate) over time, resulting in reduced resource extraction over the lifetime of the well pad.

BRIEF DESCRIPTION

In an embodiment, a system is provided that includes a schedule generator. The schedule generator includes one or more processors configured to obtain resource extraction parameters for extracting a resource from a reservoir. The resource extraction parameters include well creation parameters associated with drilling wellbores in the reservoir, well stimulation parameters associated with introducing fracturing fluid into the wellbores to create fractures in the reservoir emanating from the wellbores, and production parameters associated with controlling extraction of the resource from the reservoir through the wellbores. The schedule generator is configured to select multiple initial trial schedules that include different values of the resource extraction parameters and receive initial resource output data that is generated by execution of the initial trial schedules with a designated model of the reservoir. The schedule generator is further configured to generate a surrogate model based on the initial resource output data and the initial trial schedules and use the surrogate model to perform multiple iterations of selecting a modified trial schedule until a predetermined condition is satisfied. The schedule generator receives modified resource output data generated by execution of the modified trial schedule with the designated model of the reservoir. The modified trial schedule for each iteration is selected based on the initial resource output data, the initial trial schedules, and, if available, prior modified trial schedules and prior modified resource output data.

In another embodiment, a method is provided that includes obtaining resource extraction parameters for extracting a resource from a reservoir. The resource extraction parameters include well creation parameters associated with drilling wellbores in the reservoir, well stimulation parameters associated with introducing fracturing fluid into the wellbores to create fractures in the reservoir emanating from the wellbores, and production parameters associated with controlling extraction of the resource from the reservoir through the wellbores. The method further includes selecting a set of initial trial schedules that include different values of the resource extraction parameters, receiving initial resource output data that is generated by execution of the initial trial schedules with a designated model of the reservoir, generating a surrogate model based on the initial resource output data and the initial trial schedules, and performing a plurality of iterations of the following until a predetermined condition is satisfied. The iterations include selecting, using the surrogate model, a modified trial schedule based on the initial resource output data and the initial trial schedules and, if available, prior modified trial schedules and prior modified resource output data from prior iterations. The iterations further include receiving modified resource output data that is generated by execution of the modified trial schedule using the designated model of the reservoir, and updating the surrogate model with the modified resource output data and the modified trial schedule.

In another embodiment, a system is provided that includes a schedule generator and a central controller. The schedule generator includes one or more processors configured to perform multiple iterations of selecting a trial schedule for extracting a resource from a reservoir and obtaining resource output data that is generated by evaluating the trial schedule in a designated model of a reservoir. The trial schedules of the multiple iterations include different values of resource extraction parameters associated with drilling wellbores in the reservoir, introducing a fracturing fluid into the wellbores, and controlling extraction of the resource from the reservoir through the wellbores. The schedule generator is configured to select the values of the resource extraction parameters for the trial schedule of each subsequent iteration using a surrogate model. The surrogate model includes the trial schedules and resource output data of prior iterations. The schedule generator is configured to perform the multiple iterations until a predetermined condition is satisfied to identify a work schedule. The resource output data is associated with work schedule having an improved metric-of-interest relative to the resource output data associated with the other trial schedules that are evaluated. The central controller includes one or more processors configured to control introduction of the fracturing fluid into the wellbores of the reservoir according to the values of the resource extraction parameters in the work schedule.

BRIEF DESCRIPTION OF THE DRAWINGS

The subject matter described herein will be better understood from reading the following description of non-limiting embodiments, with reference to the attached drawings, wherein below:

FIG. 4 illustrates graphs showing the use of Gaussian Processes (GP) as a means to build a surrogate model of the underlying response surface using the sampling according to one embodiment;

FIG. 6 is a table showing multiple parameters used to generate a work schedule according to a working example of the method shown in FIG. 3;

DETAILED DESCRIPTION

Figure 1:
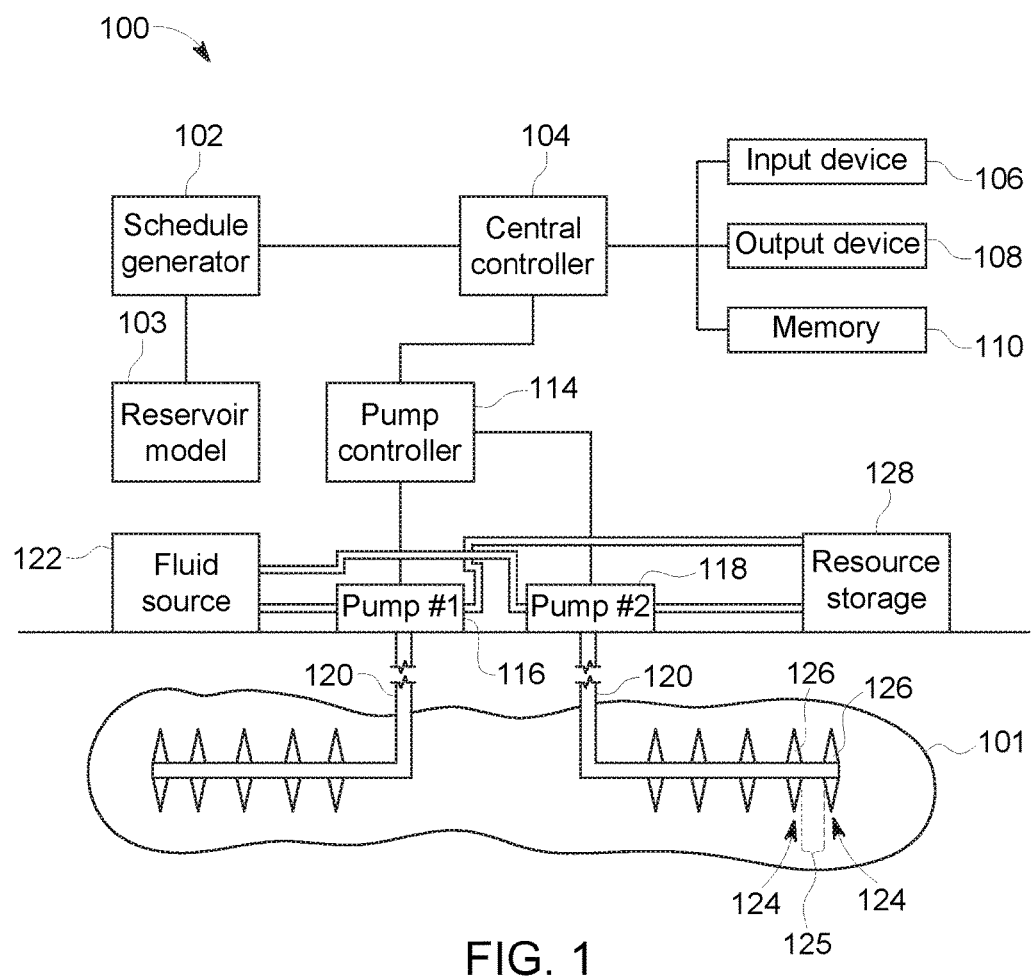
FIG. 1 illustrates a block diagram of a resource extraction system according to an embodiment for controlling hydraulic fracturing-based hydrocarbon resource extraction.

One or more embodiments described herein may provide systems and methods for generating schedules that specify the parameters for extracting a hydrocarbon resource fluid (e.g., natural gas, oil, and/or brine) from a reservoir. In addition, one or more embodiments described herein provide systems and methods for designing and/or implementing a work schedule that is customized to a specific subterranean reservoir in order to increase the amount of natural gas or other hydrocarbon resource that is extracted from the reservoir, while operating within constraints such as a number of wells and a spacing between the wells.

For example, the systems and methods described herein may be used for controlling the extraction of hydrocarbon resources from either unconventional reservoirs or conventional reservoirs using hydraulic fracturing-based resource production. The workflow schedules specify parameters associated with the creation of the wells (also referred to as wellbores) in a well pad, the stimulation of the wells by injecting a hydraulic fracturing fluid into the wells, re-stimulation of the wells by injecting a fluid (e.g., gas, water, a liquid solvent, or the like) into the wells for enhanced oil recovery (EOR), and the production (or pressure depletion) of the resource from the wells throughout an operational lifetime of the well pad. As used herein, enhanced oil recovery (EOR), also known as improved oil recovery (IOR), is used broadly to refer to post-production injection of a fluid into a well from which a resource has already been extracted in order to increase the amount or rate that the resource is extracted from the well. Thus, EOR/IOR can refer to refracturing by reinjecting a fracturing fluid into the well, cyclic gas injection into the well, and the injection of other fluids into the well to increase resource extraction.

In one or more embodiments described herein, multiple workflow schedules may be iteratively selected and evaluated using one or more models to further refine or modify the schedules of subsequent iterations. For example, the values of the parameters for each subsequent schedule are selected based on the results or outputs from evaluating previous schedules in a reservoir model. The work schedule is selected in order to increase a production output of the well pad, such as a cumulative amount of the resource extracted or a net present value, relative to operation of the well pad according to a different schedule.

In one or more embodiments described herein, the methods and systems identify principal parameters from hydraulic fracturing through final production stages. The methods and systems utilize meta-modeling (including surrogate modeling and simulation modeling) to generate the work schedule for controlling the extraction of the resource during an operational lifetime of the well pad. The surrogate model uses the design space defined by the identified principal parameters to intelligently and sequentially select subsequent schedules to evaluate in the reservoir simulation model (which may include or represent a hydraulic fracture model). Each extracted production schedule is evaluated in the reservoir simulation model to output results that are utilized to develop a surrogate model. Over a sequential process, the surrogate model is updated to reflect output results from previous simulations. Using the sequential surrogate model, subsequent schedules may be developed that gradually converge towards a work schedule that is "optimized," meaning that the work schedule may increase the production output (e.g., cumulative natural gas production, natural gas flow rate, fracturing fluid utilization efficiency, net present value, etc.) relative to operation of the well pad according to a different one of the evaluated schedule having different values of the parameters.

As used herein, an "optimized" work schedule includes a work schedule that is customized for a reservoir, which may or may not represent the best possible work schedule for that reservoir. For example, the optimized work schedule may represent the work schedule of multiple generated or available work schedules that is expected to perform the best in one or more key metrics. In one embodiment, an optimized work schedule may generate a greater amount of resources from a given reservoir relative to other work schedules that are selected and evaluated, but does not necessarily generate the greatest possible amount of the resources. In another embodiment, the optimized work schedule may result in a greater profit of extracting the resource from the reservoir compared to the other work schedules that are selected and evaluated. An optimized work schedule may improve one or more metrics-of-interest compared to other evaluated work schedules. The one or more metrics-of-interest may include net present value (NPV), cumulative resource production, resource extraction flow rate, fracturing fluid (e.g., water) utilization efficiency, or cash flow. A metric-of-interest may be limited by a certain time period. For example, a multi-variable function may be used to identify a schedule that provides an improved NPV and an improved cash flow for the next five years. It should be understood that other possible metrics than those described above are contemplated.

The sequential sampling provided using the surrogate model allows for a significant reduction in the number of investigations or evaluations that are performed on the reservoir simulation model compared to traditional reservoir simulation optimization techniques. The traditional reservoir simulation optimization techniques may use space-filling designs and large sample sets to capture the complexity of the response surface. For example, instead of hundreds of evaluations, the surrogate model may be able to reach an optimized work schedule in less than twenty evaluations. Therefore, the surrogate modeling described herein can reduce the calculation period by five times or more, such that a solution can be generated in a matter of hours or days instead of months or years.

The analytical capabilities and machine learning described herein are used to integrate reservoir performance with operations and improve workflows for economic optimization and reservoir management. Leveraging such digital technology can allow for automation of the process and remote monitoring of the asset (e.g., well pad). For example, field operators can monitor and track the resource recovery in real-time, and, in the presence of deviations from the expected or designated resource output data, the systems and methods disclosed herein can be used to re-configure and/or update the work schedule, either autonomously or through suggested operator input, during the extraction of the resource.

The systems and methods described herein are designed for providing a drilling, stimulation, pressure drawdown, and injection configuration plan (or schedule) for optimizing an infill drilling schedule, a greenfield pad drilling schedule, a refracturing operation, and/or an EOR operation for a designated well pad. The method uses a geomodel, a fracture model, and a reservoir model to investigate and optimize well configurations in the subsurface. The greenfield pad drilling schedule is done without previous production in the reservoir area or lease area, and the infill drilling schedule is done in the presence of pre-existing or parent wells. The parameters investigated include a production start date, a time to start infill drilling (which may be ignored for the greenfield pad drilling schedule), a sequence to drill wells, a number of wells, a spacing between wells, a fracture design geometry (e.g., size of the fractures), an amount and type of proppant injected, a number of fracture stages in each wellbore, a bottom hole flowing pressure in the wellbores of the well pad during resource extraction, a pressure step rate (which identifies a time period between changing the bottom hole flowing pressure in the wellbores), and the like. The bottom hole flowing pressure and pressure step rate may represent parameters of an artificial lift design that describes how the resource is extracted from the reservoir. The infill drilling, refracturing, and EOR operations would incorporate different constraints depending on the current state of production, such as the locations of pre-existing wells (for infill drilling), the number of pre-existing fracture stages (for refracturing), or the amount of gas to inject into the wells for EOR cyclic gas injection. The parameters or control variables for optimization may represent the full operational lifetime of the well pad including drilling the wells during a creation phase, injecting fracturing fluid in the wells during a stimulation phase, extracting the resource from the wells during a production phase, and injecting fluids during the re-stimultion or EOR phase until the well is eventually shut in due to uneconomical production. The methods and systems described herein are configured to bring optimization of the resource production throughout the whole operational lifetime of the well pad.

FIG. 1 illustrates a block diagram of a resource extraction system 100 according to an embodiment for controlling hydraulic fracturing-based hydrocarbon resource extraction. The resource extraction system 100 can be used to implement one of the schedules described above which designate specific values of resource extraction parameters in order to increase one or more of the metrics-of-interest during the operational lifetime of a well pad. At least some of the components shown in FIG. 1 may be communicatively coupled to each other by one or more wired and/or wireless connections.

The system 100 is located on an area (referred to as a lease area or reservoir area) above a subterranean reservoir 101 that includes a hydrocarbon resource therein. The reservoir 101 optionally may be shale rock, a coal bed, tight sandstone, or another unconventional reservoir that has a relatively low porosity and/or permeability (e.g., such as less than 0.1 millidarcy (mD)) compared to typical or "conventional" hydrocarbon-bearing reservoirs. Due to the low porosity and/or permeability of the reservoir 101, hydraulic fracturing is used to increase the flow of the hydrocarbon fluid (e.g., oil, natural gas, and brine) towards the wellbores 120. Alternatively, the reservoir 101 may have a permeability that is greater than 0.1 mD and/or is a conventional reservoir. In the illustrated embodiment, the system 100 is associated with a well pad that includes two wellbores 120. Although two wellbores 120 are shown, the well pad may include additional wellbores. For example, additional wellbores may be drilled on the well pad during an infill drilling operation.

The system 100 includes a central controller 104, which can represent one or more processors (e.g., microprocessors, field programmable gate arrays, application specific integrated circuits, multi-core processors, or other electronic circuitry that carries out instructions of a computer program by carrying out arithmetic, logical, control, and/or input/output operations specified by the instructions). The instructions used to direct operations of the central controller 104 may be based on or contained within a work schedule received from a schedule generator 102.

The central controller 104 includes and/or is connected with an input device 106, such as an electronic mouse, keyboard, stylus, touchscreen, microphone, or the like. The input device 106 may receive information from an operator of the system 100, such as a selection of a work schedule from among a list of multiple schedules, user-input constraints associated with well creation, well stimulation, and/or resource production, or the like. The user-input constraints associated with well creation may include a lower limit and/or an upper limit of the number of wellbores drilled in the reservoir 101. The user-input constraints associated with well stimulation may include an upper limit of the amount of fracturing fluid and proppant that can be injected into the wellbores 120, an upper limit on the number of fracture stages for the wellbores 120, and/or an upper limit on the pressure applied to the fracturing fluid to create the fractures in the reservoir 101. The user-input constraints associated with resource production may include a lower limit and/or an upper limit on the bottom hole flowing pressure in the wellbores 120 used to control the flow of the resource from the reservoir 101 to the surface through the wellbores 120. It is recognized that the user-input constraints listed above are exemplary only, and are not necessarily the only user-input constraints that are used to generate the work schedule, as described in more detail herein.

The central controller 104 includes and/or is connected with an output device 108, such as a monitor, touchscreen (which may be the same component as the input device 106), a speaker, printer, or the like. The output device 108 may communicate information to the operator of the system 100, such as the work schedule, other schedules that are evaluated, expected resource output data generated by evaluating one or more of the schedules in the reservoir simulation model, an identification of a current phase of the well pad (e.g., well creation, well stimulation, or resource production) and other associated status information, the rates and/or amounts of the resource that is being extracted from the reservoir 101, a cumulative total amount of the resource that has been extracted from the reservoir 101 to date, a cumulative amount of the fracturing fluid that has been injected into the wellbores 120 to date, etc.

The central controller 104 includes and/or is connected with a memory 110, such as a computer hard disc, read only memory, random access memory, optical disc, removable drive, etc. The memory 110 can store information such as schedules, parameters, historical data, reservoir models, amounts of available fracturing fluid in a fluid source reservoir 122, etc.

The central controller 104 is configured to communicate with a schedule generator 102 that is configured to generate a work schedule for controlling the extraction of the resource from the reservoir 101. As described below, the schedule generator 102 can create and/or modify the schedules based on various resource extraction parameters. For example, the schedule generator 102 may receive resource extraction parameters (e.g., user-input constraints from an operator using the input device 106) from the central controller 104, and may transmit the resulting work schedule back to the central controller 104 for implementation by the central controller 104 on the well pad. The schedule generator 102 includes or represents one or more processors (e.g., microprocessors, field programmable gate arrays, application specific integrated circuits, multi-core processors, or other electronic circuitry that carries out instructions of a computer program by carrying out arithmetic, logical, control, and/or input/output operations specified by the instructions). The instructions used to direct operations of the schedule generator 102 may represent or be based on one or more flowcharts and/or other operations described herein, such as the method 600 shown in FIG. 3.

The schedule generator 102 is operatively connected to a reservoir model 103 (also referred to herein as a reservoir simulation model), which is used to evaluate the schedules selected by the schedule generator 102 to provide resource output data associated with each evaluated schedule. Optionally, the reservoir model 103 may be a collection or combination of multiple models. The reservoir model 103 is configured to run simulations for the schedules to model the effects of performing the hydraulic fracturing-based resource extraction in the specific reservoir 101 according to each schedule over a period of time, such as five year, ten years, or greater. The reservoir model 103 may represent or incorporate any of various types of mathematic models for solving differential equations, such as analytical models, numerical models, finite-difference models, or the like. The reservoir model 103 may be a software-based program that is installed as a package in a computer hardware device, incorporated as subroutines in an operating system, or contained in a stand-alone hardware device. The reservoir model 103 is shown in FIG. 1 as a separate component than the schedule generator 102 and the central controller 104. For example, although not shown, the reservoir model 103 may be incorporated or installed within a client computing device 710 (shown in FIG. 8). In an alternative embodiment, the reservoir model 103 may be installed or incorporated within the schedule generator 102 or the central controller 104, such as stored in the memory 110 of the central controller 104. Alternatively, the sets of instructions in the software-based program of the reservoir simulation model 103 may be hard-wired into the logic of a device, such as by being hard-wired logic formed in the hardware of the schedule generator 102, the central controller 104, or a client computing device 710.

The reservoir simulation model 103 may be created using historical data and information about the specific reservoir 101. In an embodiment, the reservoir model 103 incorporates a static geological model of the reservoir, a fracture model of the reservoir, and a fluid dynamic model of the reservoir. The static geological model represents the geometry and character of the media of the reservoir 101, such as the structure, porosity, permeability, and oil saturation of the reservoir 101. The fracture model represents the effect that injecting the fracturing fluid into the wellbores 120 under pressure will have on creating factures due to the stress states of the reservoir 101. The fluid dynamic model describes the nature of the various fluid phases present in the reservoir 101, such as the composition and viscosity of the hydrocarbon resource in the reservoir 101 due to changes in saturation, pressure, and stress over time. The reservoir simulation model 103 includes a history-match aspect in which the current performance parameters of a designated schedule are compared to historical performance of similar reservoirs and adjustments are made to reasonably represent reality. For example, the reservoir simulation model 103 can compare the parameters of the geological environment of a new reservoir 101 with parameters of known geological environments of previously-produced reservoirs having known outcomes (e.g., known amounts of resource extracted for various parameters such as number of wellbores and number of fracture stages). Based on similarities and/or differences with the previous reservoirs, the reservoir simulation model 103 can estimate production from the new reservoir 101 under similar or non-similar conditions.

The work schedule generated by the schedule generator 102 may be used as a guide for controlling all phases of resource extraction of the reservoir 101, such as well creation, well stimulation by injecting a fracturing fluid into the wellbores 120 to create fractures in the reservoir 101, and resource production. In the illustrated embodiment, two wellbores 120 are drilled. The illustrated wellbores 120 are horizontal wells that extend a lateral length along the specific layer of the reservoir 101. The wellbores 120 have a vertical segment that extends a depth underground, such as at least 100 meters (m), at least 500 m, at least 1000 m, or the like. The vertical segments of the wellbores 120 are truncated in FIG. 1 for illustrative purposes. The wellbores 120 have horizontal segments extending from the end of the respective vertical segment to a distal end of the respective wellbore 120. The horizontal segments may extend lateral lengths of at least 100 m, at least 500 m, at least 1000 m, or the like. The horizontal segments allow the wellbores to increase the contact area between the wellbores 120 and the reservoir 100, as the reservoir 100 may be defined by a mineral layer that has a shorter height than lateral length. Although described as vertical segments and horizontal segments, the horizontal segments need not extend at right angles from the vertical segments. For example, the horizontal segments may be slanted such that the horizontal segments do not extend parallel to the ground surface. In an alternative embodiment, the wellbores 120 may be vertical or slanted along an entire length of the wellbores, such that the wellbores 120 lack the horizontal segments shown in FIG. 1.

The horizontal segments of the two wellbores 120 shown in FIG. 1 extend in opposite directions from one another, which allows for the wellbores 120 to be located relatively close together without interfering with each other. For example, the horizontal segments of the wellbores 120 may be at approximately the same depth below the ground, but extend in different directions from the respective vertical segments. Alternatively, the horizontal segments 120 may extend in generally the same direction, but are spaced apart from one another vertically, laterally, and/or longitudinally. For example, the wellbores 120 may be stacked vertically such that the horizontal segments 120 are disposed at different depths in the reservoir 101. In embodiments that include more than two wellbores, the well spacing between adjacent wellbores may optionally may refer to a distance and/or a radial angle between the horizontal segments of the adjacent wellbores. Although not shown in FIG. 1, the central controller 104 may communicate with drilling equipment and/or with operators of the drilling equipment via the output device 108 and/or a communication device to control the drilling of the wellbores 120 according to designated values of well creation parameters in the work schedule. For example, the work schedule may designate a number of wellbores drilled; depths, sizes, lengths of the horizontal segments, well spacing distances and/or angles, and the like.

During the well stimulation phase, the central controller 104 communicates with a pump controller 114 to control the rate of injection of a fracturing fluid from a fluid source 122, such as a tank or storage vessel, into the wellbores 120 and the pressure applied to the fracturing fluid. The pump controller 104 is communicatively coupled with a first pump 116 and a second pump 118 that pump the fracturing fluid into the wellbores 120 under pressure to cause the reservoir 101 to fracture emanating from the wellbores 120. For example, the first pump 116 and the second pump 118 are each associated with a different one of the wellbores 120. In the illustrated embodiment, the pumps 116, 118 are similar to one another, and may be identical. Optionally, the pump controller 114 controls both pumps 116, 118 by communicating control signals through wired or wireless connections to the pumps 116, 118 to control an output of the pumps 116, 118, such as an amount of positive pressure to apply to the wellbores 120 when injecting the fracturing fluid into the wellbores 120. In an alternative embodiment, the pumps 116, 118 may each be controlled by a different pump controller instead of both being controlled by the pump controller 114. In another alternative embodiment, the central controller 104 may control the pumps 116, 118 directly without the use of the pump controller 114.

The fractures in the wellbores 120 may be created using a perforated pipe gun (not shown) that is controlled to be lowered into the wellbores 120 and fire explosives at designated locations of the wellbores 120 along the lengths of the wellbore 120. The explosive charges penetrate casings of the wellbores 120 and cause cracks in the reservoir 101. Each location that the pipe gun fires explosives indicates a stage 124. The number of stages 124 and the spacing 125 between stages is controlled according to the work schedule that is being implemented. The well spacing 125 may be maintained at a constant distance along the length of the wellbores 120, or alternatively may vary. Although each wellbore 120 includes five stages 124 in the illustrated embodiment, the wellbores 120 may have more or less stages in other embodiments, such as up to or exceeding thirty stages.

After the pipe gun is removed, the pumps 116, 118 are configured to inject fracturing fluid from the fluid source 122 into the wellbores 120. The fracturing fluid may be slurry composed of water, a proppant particles, and chemical additives. The proppant particles may be sand or ceramic particles. The fracturing fluid may be mostly water, such as 80% to 95% water by mass and mixed with gels additives or liquefied gas. The proppant particles may make up approximately 4% to 14% of the fracturing fluid, and the chemical additives may make up approximately 0.1% to 2% of the fracturing fluid. The fracturing fluid injected into the wellbores 120 is put under pressure by the pumps 116, 118, which causes the fracturing fluid to penetrate the cracks in the reservoir 101, resulting in larger fractures 126 of the reservoir 101 at the stages 124. The fracturing fluid may be injected into the wellbores 120 at an injection rate up in a range of 100 liters per second (L/s) to 300 L/s, or greater, and at a pressure in a range of 5,000 psi to 20,000 psi, or greater. The injection flow rate and pressure may be limited by the equipment used, such as the capabilities of the pumps 116, 118 and/or the amount of fracturing fluid available in the fluid source 122. After the fracturing fluid fractures the reservoir 101, the fracturing fluid may be drawn from the wellbores 120 to a disposal or recycling reservoir (not shown). At least some of the proppant particles remain in the fractures 126 when the water and other chemicals are removed and provide mechanical structure to prevent the fractures 126 from closing, allowing the hydrocarbon resource in the reservoir 101 to flow through the fractures 126 to the wellbores 120.

The resource production phase follows the well stimulation phase. During the resource production phase, the hydrocarbon resource is extracted from the reservoir 101 through the wellbores 120 and is directed to a resource reservoir 128. The resource is natural gas, but also may include oil, brine, and other hydrocarbon compositions. The extraction of the resource may be controlled by the pumps 116, 118, which control a bottom hole flowing pressure in the corresponding wellbores 120. The bottom hole flowing pressure is a parameter that is designated in the work schedule. For example, the pumps 116, 118 are configured to control the pressure within the wellbores in order to provide a designated pressure differential (also referred to as a drawdown pressure) between the pressure in the reservoir and the pressure in the wellbores 120. A pressure differential that is too low will not provide a sufficient flow rate of resource from the reservoir 101, while a pressure differential that is too high may cause a flow rate of resource that exceeds the handling capabilities of some of the equipment or closing of the hydraulic fractures. The pressure differential that is too high may result in damage or cause some of the proppant to be transported out of the fracture system and reduce the ability of the hydrocarbon resource to flow to the wellbore. In addition to designating the bottom hole flowing pressure, the work schedule also may designate a step rate and a function for adjusting the pressure over time as the pressure in the reservoir 101 decreases due to the reduction in the amount of the resource in the reservoir 101. Although the same pumps 116, 118 are described in FIG. 1 as being used for both well stimulation and resource production, it is recognized that different pumps may be used. For example, the fluid pumps may be used for well stimulation to inject the fracturing fluid, and gas pumps may be used for resource production to control the flow of natural gas from the wellbores 120.

Figure 2:
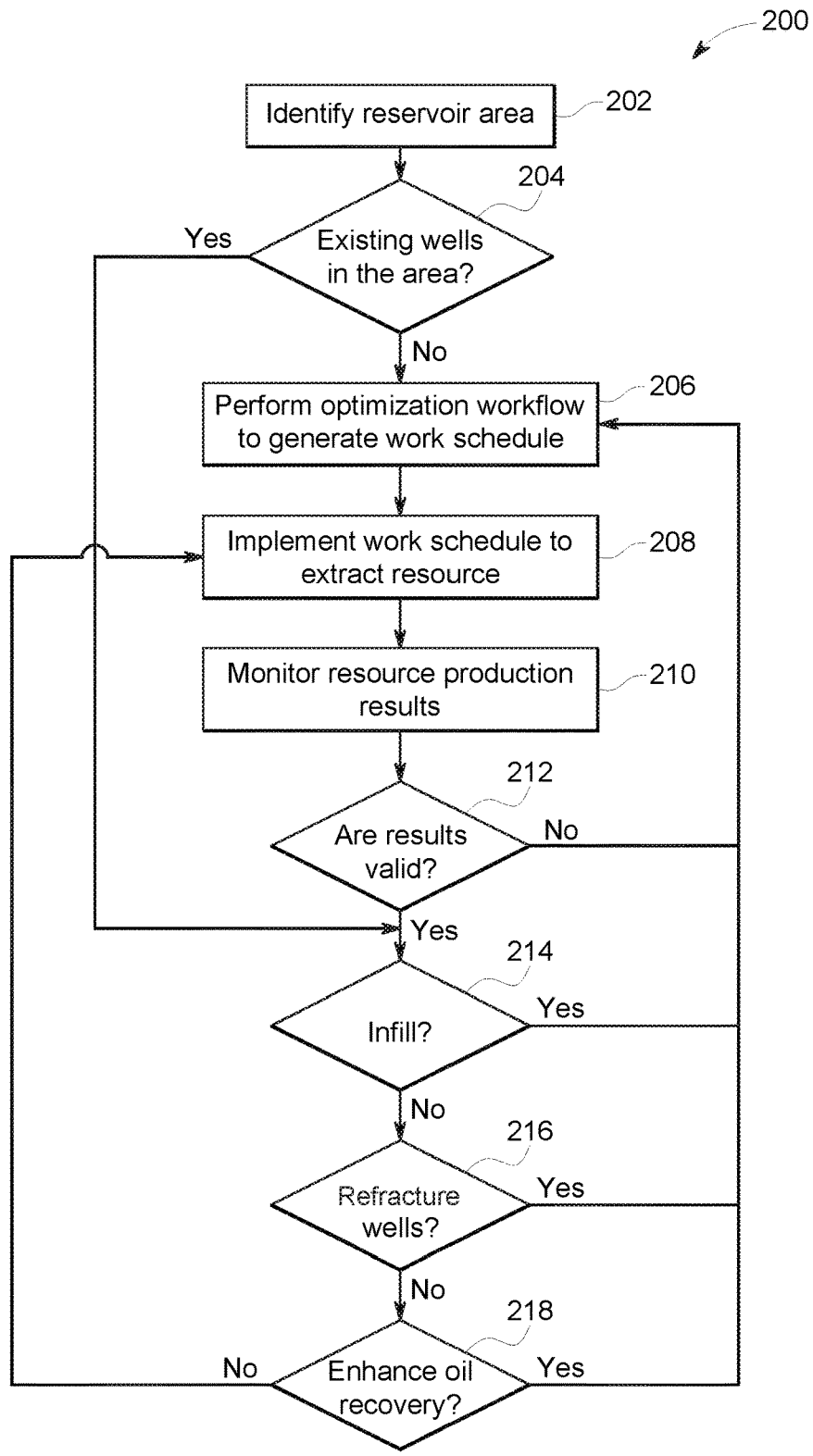
FIG. 2 is a flow chart for a method of controlling hydraulic fracturing-based resource production from a reservoir according to an embodiment.

After starting production, the work schedule may designate additional changes over the operational lifetime of the well pad in order to increase one or more metrics-of-interest, such as the amount of resource extracted or the net present value of the well pad. For example, the work schedule may designate that, after a certain amount of time, additional infill wellbores should be created in the well pad to extract undrained areas missed by other wellbores in the well pad. In another example, the work schedule may designate that the wellbores 120 should be refractured after a certain amount of time by injecting more fracturing fluid to increase the number of stages 124 or increase the size of the fractures 126 to contact undrained reservoir rock. The work schedule also may designate the use of an enhanced oil recovery method, such as by injecting gas into the wellbores 120 after a certain amount of time has elapsed since beginning production. In an embodiment, the central controller 104 includes a clock (not shown) that is used to determine when to implement any such enhanced recovery techniques as designated by the work schedule FIG. 2 is a flow chart for a method 200 of controlling hydraulic fracturing-based resource production from a reservoir according to an embodiment. The method 200 may be performed by the resource extraction system 100 shown in FIG. 1. For example, the central controller 104 and the schedule generator 102 may together perform all or some of the method 200. At 202, a reservoir area is identified. The reservoir area is associated with an area above a designated reservoir that includes a hydrocarbon resource to be extracted. The reservoir area may be a lease area. In an embodiment, the central controller 104 of the resource extraction system 100 identifies the reservoir area at 202 based on an operator input using the input device 106 shown in FIG. 1, such as by entering specific coordinates of the reservoir area or selecting the area from a map.

At 204, a determination is made whether there are existing wells (or wellbores) in the reservoir area. If there are no pre-existing wells, then the area is a greenfield and flow continues to 206 to perform a greenfield optimization workflow to generate a work schedule. If, on the other hand, there are existing wells in the area, then flow of the method 200 proceeds to 214 and a determination is made whether or not to drill one or more infill wells in the area. If it is determined that infill wells are desired, then flow returns to 206 and an infill optimization workflow is performed to generate a work schedule. The infill optimization workflow is similar to the greenfield optimization workflow, but includes additional parameters (e.g., constraints) relating to the existence of wells and the previous extraction of resources from the reservoir. For example, in an infill optimization workflow, the locations of the existing wells are used as constraints to determine where to locate the new, infill wells. In an embodiment, upon receiving the identification of the reservoir area at 202, the central controller 104 may be configured to determine whether or not existing wells are in the area, and therefore whether to perform a greenfield optimization workflow or an infill optimization workflow at 206. For example, the central controller 104 may access a database stored locally on the memory 110 or remotely on a remote storage device to determine whether wells have been drilled previously in the area. In an embodiment, the central controller 206 may wait to perform the optimization workflow at 206 until prompted by an operator using the input device 106 or a mobile client computing device. In an alternative embodiment, the central controller 104 initiates the performance of the optimization workflow automatically upon receiving the identification of the reservoir area from the operator and determining whether there are existing wells in the area.

The work schedule that is generated from the optimization workflow represents a detailed plan, scheme, or profile for setting up and performing the hydraulic fracturing-based resource extraction. For example, the amount of natural gas or other resource produced by hydraulic fracturing is dependent on many parameters or variables. The work schedule designates specific values for the parameters. For example, during the well stimulation phase, the work schedule may designate a number of stages in each wellbore, a spacing between the stages, an amount of fracturing fluid to inject into each wellbore, an injection flow rate at which the fracturing fluid is injected into the wellbore, and a pressure that is applied to the fracturing fluid to create the fractures. The work schedule also designates specific values of parameters for other phases, including the well creation phase and the resource production phase. The designated values for the parameters may also change over time according to other parameters in the work schedule that include a designated step rate (e.g., amount of time between changes) and a designated function used to determine how the value changes over time. For example, the work schedule may designate how the bottom hole flowing pressure in the wellbores should change over time based on expected changes in the reservoir pressure. Although the work schedule may be generated prior to starting production of the resource, the work schedule optionally may also plan for additional actions, such as infilling, refracturing, and EOR, which may be scheduled years in advance. The optimization workflow, which can be used for both greenfield and infill processes, is illustrated in FIG. 3.

Figure 3:
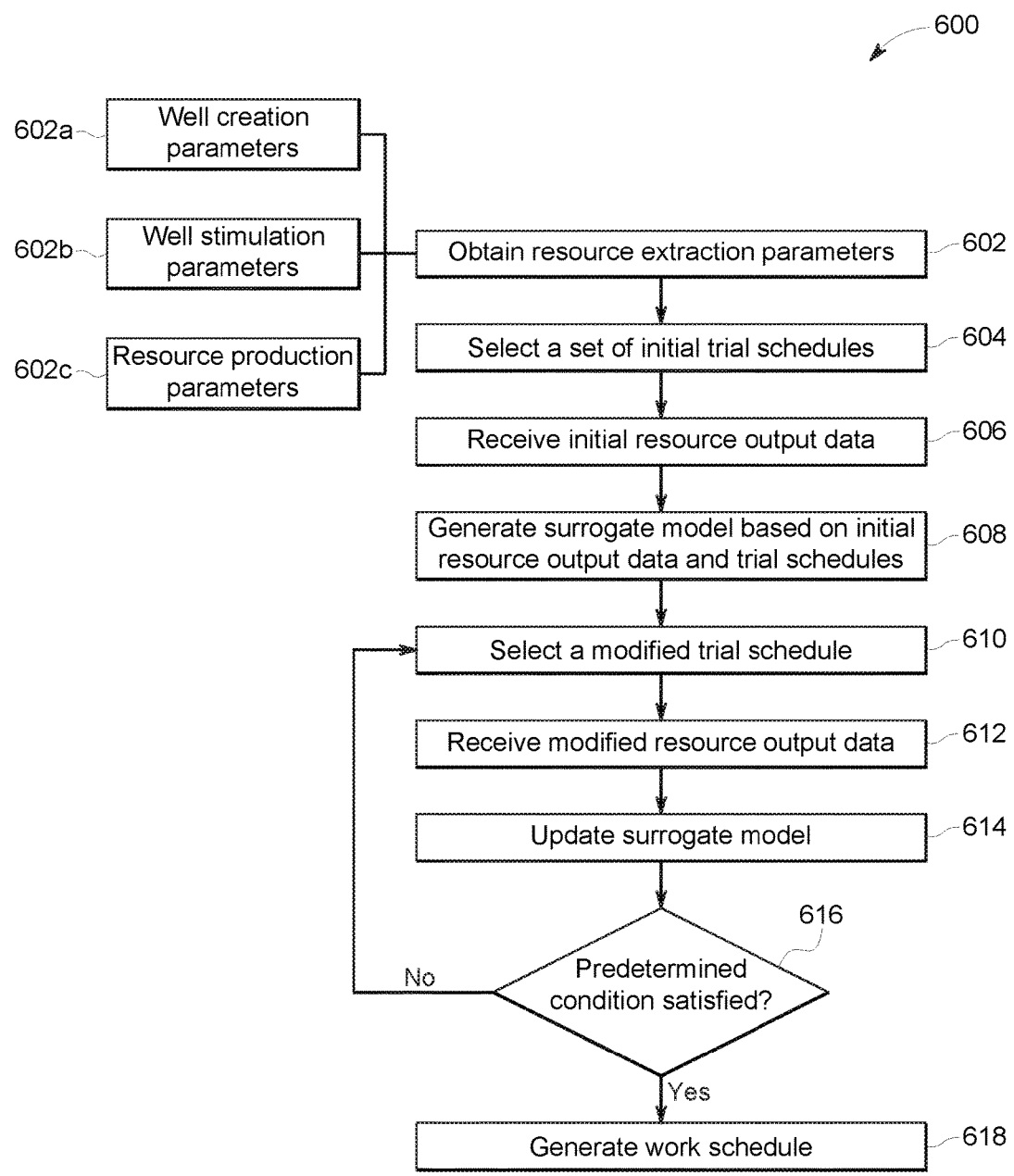
FIG. 3 shows a flow chart of a method for generating a work schedule (or plan) to extract a hydrocarbon resource from a reservoir using an intelligent sampling process.

FIG. 3 shows a flow chart of a method 600 for generating a work schedule (or plan) to extract a hydrocarbon resource from a reservoir using an intelligent sampling process. The method 600 is also referred to as the optimization workflow. The method 600 may represent an algorithm and/or be used to generate a software program. In an embodiment, the entire method 600 is performed by the schedule generator 102 shown in FIG. 1 (including one or more processors thereof). Alternatively, at least some of the method 600 is performed by the central controller 104 shown in FIG. 1 or one or more client computing devices. In some embodiments, the method 600 may be used to control computerized systems to autonomously pump fracturing fluid into the reservoir to stimulate one or more wellbores and/or autonomously control the pressure within the wellbores during resource production based on the work schedule determined by the intelligent sampling process.

At 602, the resource extractions parameters are obtained, which are used to select an initial set of trial schedules for evaluation in the reservoir model. The resource extraction parameters may be specific to the reservoir, the operating conditions, and the type of resource extraction technique. For example, the parameters specific to the reservoir may include characteristics of the reservoir such as mineral composition, porosity, permeability, depth of the reservoir, and other characteristics of the reservoir incorporated into the reservoir simulation model 103 shown in FIG. 1. The resource extraction parameters obtained for hydraulic fracturing-based resource production include well creation parameters 602A, well stimulation parameters 602B, and resource production parameters 602C. At least some of the parameters may be obtained from an operator input or by accessing a database, such as in the memory 110 or another memory device. The operating conditions may include constraints or limits, such as a fracturing pressure upper limit, a capital investment limit, a type of artificial lift employed, compression, and the like.

The well creation parameters 602A are associated with drilling the wellbores in the reservoir. For a greenfield which lacks existing wellbores, the well creation parameters 602A may include a number of wellbores to drill in the reservoir, locations of the wellbores, a separation distance between the wellbores, geometry of the wellbores (e.g., diameter and length), depth of the wellbores, etc. The parameters may represent constraints or ranges for the values of the parameters. For example, the number of the wellbores parameter may include an upper limit of 10 wellbores and a lower limit of 3 wellbores. The optimization workflow in the method 600 is used to determine a combination of the values of the various parameters (e.g., a schedule) that will, when implemented, provide a metric-of-interest that satisfies a predetermined condition, such as to produce a designated amount of natural gas or to exceed a designated net present value. For an infill operation to add additional wellbores, the well creation parameters 602A include the known number and location of existing wellbores. Therefore, the number, locations, and spacing of the new wellbores are determined based on the known locations of the existing wellbores. In addition, the well creation parameters 602A for the infill operation may also include a time to start drilling the infill wellbores after starting production from the reservoir, which may be months or years, and a time period between the drilling of each of the infill wellbores. For example, the infill wellbores may be drilled one at a time with a time period of months or years between the drilling of each infill wellbores.

The well stimulation parameters 602B are associated with introducing fracturing fluid into the wellbores to create fractures in the reservoir emanating from the wellbores. The well stimulation parameters 602B may include a number of stages (e.g., the stages 124 shown in FIG. 1) in the wellbores, a separation distance (e.g., the separation distance 125 in FIG. 1) between the stages in each of the wellbores, a composition of the fracturing fluid, a fracture design, such as a fracture length and conductivity, an amount and/or flow rate of the fracturing fluid injected into the wellbores, a pressure at which the fracturing fluid is introduced into the wellbores, the number of perforations per fracturing stage, etc. As with the well creation parameters 602A, at least some of the well stimulation parameters 602B may represent acceptable ranges, which allows for customization. For example, the number of stages may be between 10 and 30, although the acceptable range may be greater or less in other embodiments. Other parameters may specify a single discrete value. For example, the composition of the fracturing fluid may be determined by the composition of the fracturing fluid that is available for use in the well stimulation. The fracturing fluid therefore may have a set composition including a specific water content, type and content of proppant particle, type and content of chemical additives, a specific density, and other specific characteristics. The fracture design refers to a desired geometry of the fractures that are created by injecting the fracturing fluid. The fracture geometry can include the length of the fractures emanating from the wellbores, the vertical height of the fractures, and the lateral width of the fractures. The fracture conductivity refers to how easily fluids can flow through the fractures. The fracture conductivity is based on the fracture width and height as well as the permeability of the fracture, which depends of the proppant particles. At least some of the well stimulation parameters may be limited due to equipment limitations or supply limitations. For example, the amount and/or flow rate of the fracturing fluid may be limited by the available supply of fracturing fluid, and the pressure applied to the fracturing fluid may be limited by the capabilities of the pumping equipment (e.g., the pumps 116, 118 shown in FIG. 1) that is installed.

Optionally, the well stimulation parameters 602B may also include refracturing parameters when refracturing can be used to increase resource output over the operational lifetime of the well pad. Refracturing refers to re-introducing a fracturing fluid into the wellbores, subsequent to extracting some of the resource from the reservoir, to enlarge the size or increase the quantity of the fractures for increasing the amount of resource extracted. The refracturing parameters may include a time to begin refracturing after the production start date, the number, location, and spacing of the new stages relative to the existing stages, the new fracture design parameters, the injection rate of the fracturing fluid, and/or the pressure applied to the fracturing fluid.

The resource production parameters 602C are associated with controlling the extraction of the resource form the reservoir through the wellbores. The resource production parameters 602C may include a bottom hole flowing pressure, a bottom hole flowing pressure adjustment rate, a bottom hole flowing pressure taper curve, etc. The bottom hole flowing pressure refers to the pressure within each of the wellbores, which may be controlled using pumping equipment, such as the pumps 116, 118 shown in FIG. 1, a choke, or the like. For example, the pumping equipment may include an electric submersible pump (ESP), a downhole hydraulic pump, a beam pump, or the like. The pumping equipment and/or the choke is configured to control the bottom hole flowing pressure in order to control the pressure differential between the pressure in the reservoir and the pressure in the wellbore. The pressure differential is maintained such that the reservoir pressure is greater than the bottom hole pressure in order to cause the resource to flow from the reservoir into the wellbore. The pumping equipment may direct the resource to the surface using artificial lift techniques. As described above, the resource production parameters 602C may include acceptable ranges that allow for customization. For example, the bottom hole flowing pressure may specify an upper limit and a lower limit. The bottom hole flowing pressure adjustment rate refers to a time period between adjusting the bottom hole pressure in the wellbores. The bottom hole pressure taper curve refers to a family of curves or functions used to control how the pressure is adjusted over time. For example, as the pressure in the reservoir decreases over time due to the extraction of the resource, the bottom hole flowing pressure is configured to be reduced over time to maintain a specific pressure differential or range of pressure differentials. The taper curve is used to determine how the bottom hole flowing pressure is changed over time, such as the amount that the pressure is reduced at each adjustment step. The taper curve may be a decay exponential curve or another type of curve.

At 604, a set or group of initial trial schedules may be selected. The initial trial schedules are selected by selecting values for the various parameters of the well creation, well stimulation, and production phases. The initial trial schedules are selected such that the trial schedules have different values for the parameters. For example, a first initial trial schedule may designate that the wellbores have 15 stages and a second trial schedule may designate that the wellbores have 20 stages. Therefore, none of the initial trial schedules are identical, although some of the values of the parameters may be the same for multiple initial trial schedules. However, the initial trial schedules are also selected such that the values of the parameters are within designated limits, constraints, and acceptable ranges. For example, none of the initial trial schedules designates that the wellbores have only two stages, which is outside of the acceptable range for the number of stages parameter. In an embodiment, the schedule generator 102 selects the initial trial schedules. The initial trial schedules may be distributed within a sample space. In other words, the resource extraction parameters may be selected so that the initial trial schedules provide a gross or overall view of the sample space so that later, modified trial schedules may be selected based on a range of information. The sample space may be infinite. By way of example, the set may include between five and ten initial trial schedules. The trial schedules may be distributed from one extreme to another (e.g. maximum and minimum) in the sample space, and may be generally evenly distributed throughout the sample space. In an embodiment, the values for the resource extraction parameters are selected using a space-filling design function, such as Latin Hypercube.

During production, the resource output is affected by the values of the parameters that are implemented. Due to the complexity and number of the parameters, it is difficult to compare the initial trial schedules in terms of resulting resource output, water utilization, energy cost, and other metrics-of-interest. Therefore, the initial trial schedules are evaluated using the reservoir model 103 shown in FIG. 1, which is developed based on the specific reservoir and known information about similar reservoirs.

At 606, initial resource output data is received. The initial resource output data is generated by the initial trial schedules being executed (or simulated) by the reservoir simulation model 103 to generate initial resource output data. The initial resource output data for an initial trial schedule may include, for example, a cumulative amount of the resource extracted using the respective trial schedule; a flow rate of the resource extracted from the reservoir; an amount of the fracturing fluid (e.g., water) that is used, or an amount of the fracturing fluid that can be recycled. Optionally, the resource output data may be combined with economic data, such as the prices of natural gas and oil, fracturing fluid cost, drilling costs, operating costs (e.g., lifting costs), fluid recycle costs, interest rates, inflation rates, etc. to provide the resource output data in terms of net present value (NPV), net operating cost, net profit, or the like.

In some embodiments, the initial trial schedules are simulated by the reservoir model on-site, such as proximate to the reservoir. In other embodiments, however, the initial trial schedules are prepared at a first location and communicated to a second location (e.g., location of a client enterprise) where the reservoir model is stored. The client enterprise may then execute (e.g., simulate) the initial trial schedules with the reservoir model to generate the initial resource output data. The initial resource output data may then be communicated to the first location for generating a surrogate model. Alternatively, the entire method 600 may be performed at the first location or the entire method 600 may be performed at the second location.

At 608, a surrogate model is generated based on the initial resource output data and the initial trial schedules. The surrogate model may be a software-based program generated by the schedule generator 102 shown in FIG. 1, but in other embodiments the surrogate model may be generated by the central controller 104 or client computing devices. The surrogate model is designed to provide intelligent sampling for determining subsequent modified schedules to be evaluated using the reservoir simulation model. Since the evaluations in the reservoir simulation model are time-intensive (e.g., on the order of hours or days to complete each evaluation), the use of the surrogate model for generating new sample schedules is configured to reduce the total number of evaluations performed, and total amount of time, before satisfying a predetermined condition relative to random sampling methods, such as space-filling techniques (e.g., Latin Hypercube).

Figure 4:
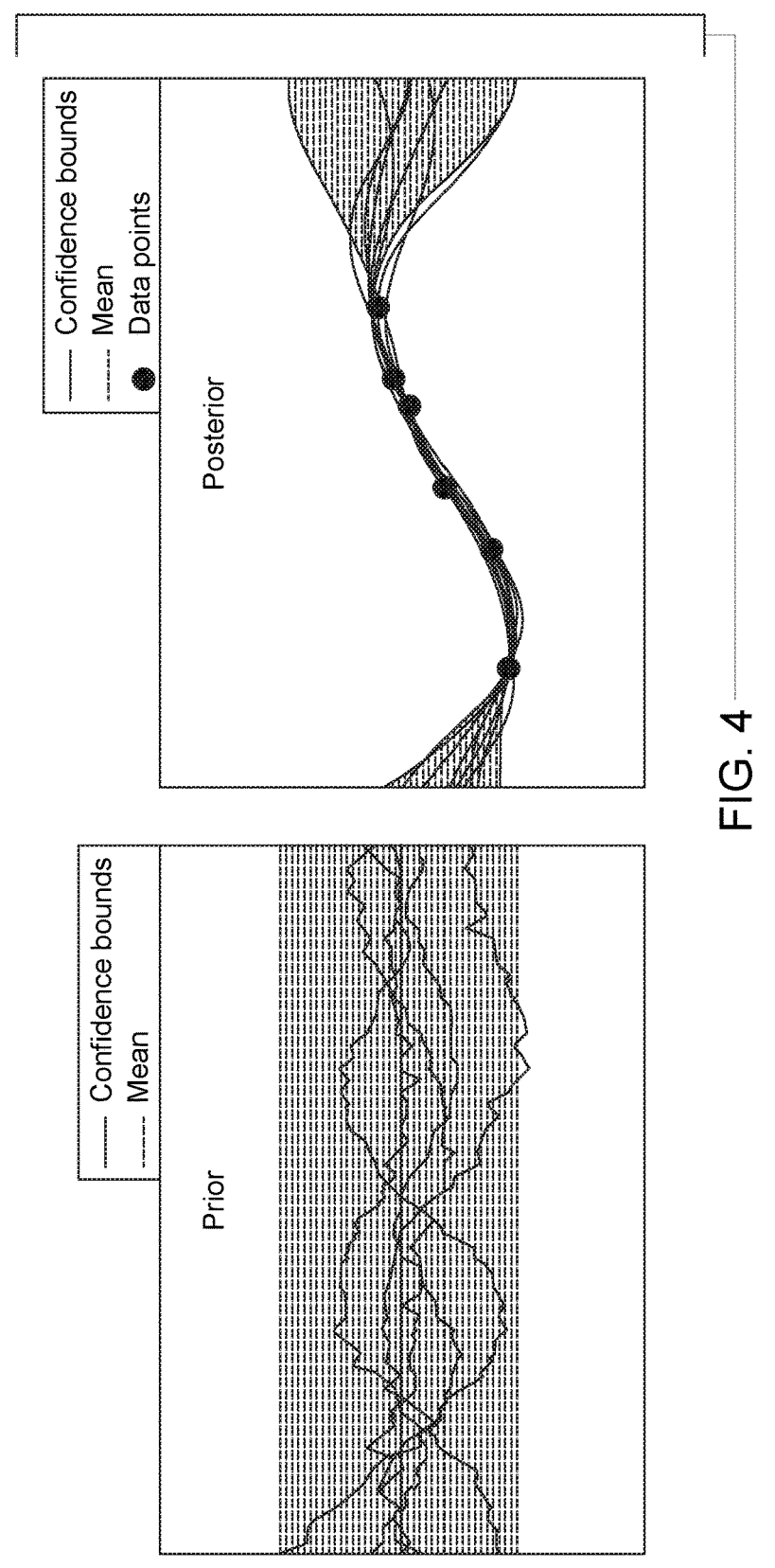

The surrogate model may be a regression model that is designed to emulate the full-scale reservoir simulation model. Optionally, a Gaussian regression may be used to build the surrogate model. For example, FIG. 4 illustrates graphs showing the use of Gaussian Processes (GP) as a means to build a surrogate model of the underlying response surface using the sampling according to one embodiment. The Gaussian regression characterizes an unknown function in terms of a Gaussian distribution over functions fully specified by a mean value and a correlation structure on the sampling input space, expressed as a kernel function. The mean value models the expected value of the underlying function being modeled and the kernel models the properties of the input-output response surface like smoothness. Starting with an infinite set of functions, the process works by narrowing down the function-set by conditioning it on actual values of the current set of sample evaluations using Bayesian estimation. In FIG. 4, the box on the left does not have data. The box on the right contains Gaussian process samples depicted by the lines and data points depicted by the black points. FIG. 4 shows how a prior set of functions narrow down to a more coherent set after having sample evaluations at the black points. The newly conditioned set of functions provides an estimate of the new mean as well as the variance at different locations in the sample space (indicated by the gray bands). An advantage of regression models is that they run almost instantaneously. This allows exploration of the idea of building regression models to emulate the underlying complex reservoir model. In this approach, an appropriate design of experiments approach is typically used to select the input samples (or trial schedules) that are evaluated using the reservoir model and used as data for constructing the regression or surrogate model. The generation of a surrogate model is also described in U.S. application Ser. No. 15/334,656, filed on 26 Oct. 2016, which is incorporated by reference herein in its entirety.

Due to the complexity and number of the parameters, it is difficult to draw conclusions from the initial resource output data, such as to determine how each of the parameters affects the resource output. In an embodiment, the schedule generator 102 includes an integrated sensitivity analysis in order to identify and classify a subset of the various resource extraction parameters (associated with well creation, well stimulation, and resource production) as principal parameters. The principal parameters are determined to have a greater influence on the resource output than other resource extraction parameters that are not designated as principal parameters. The schedule generator 102 is configured to provide increased focus and emphasis on the principal parameters when generating and updating the surrogate model and the work schedule. The sensitivity analysis further enhances the efficiency of the method 600 by reducing the number of variables that are considered when selecting the variables for each trial schedule to be evaluated. In an embodiment, the identified principal parameters may include one or more of (i) the number of wells, (ii) the number of stages per well, (iii) the fracture design (e.g., fracture geometry or dimensions), (iv) the bottom hole flowing pressure lower limit, (v) the bottom hole flowing pressure upper limit, (vi) the bottom hole flowing pressure adjustment rate, and (vii) the bottom hole flowing pressure taper curve. Optionally, infill parameters may also be considered as principal parameters, such as (viii) the time to start infill drilling and (ix) the time period between drilling infill wells. In other embodiments, the principal parameters may include additional parameters or fewer parameters than the nine parameters listed, and/or may not include all of the same parameters that are listed.

The surrogate model may be based on the identified principal parameters of the resource extraction parameters and the outcomes of the evaluations of the trial schedules, such as the resource output data. The surrogate model may represent the response of the principal parameters for each evaluation in the reservoir simulation model. For example, the surrogate model may match and/or compare the results from the evaluations of the schedules in the initial trial schedules, and may narrow spectrum bands to be used in selecting the values of the parameters for a subsequent scheme.

Figure 5:
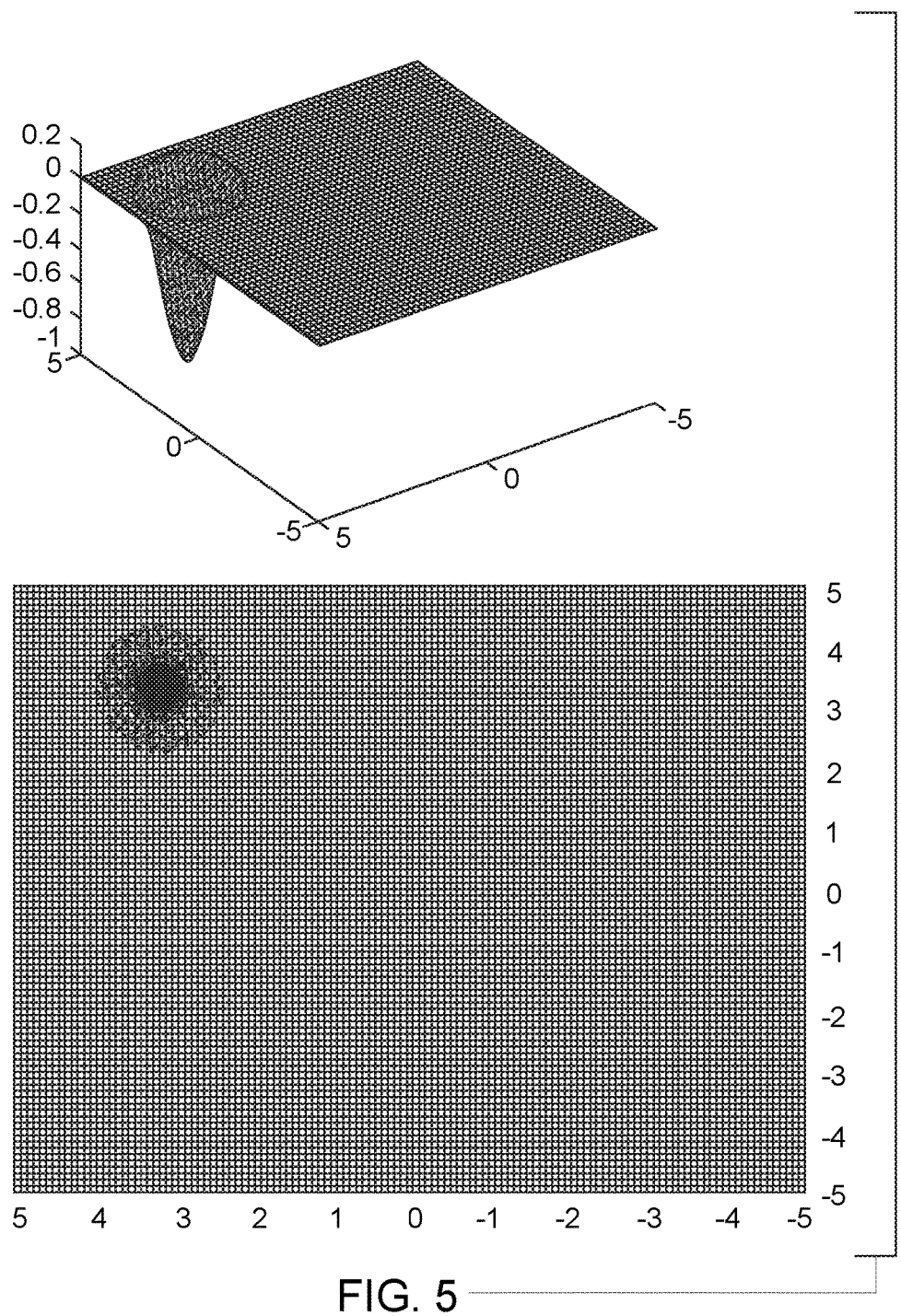
FIG. 5 illustrates an Easom benchmark test function, which provides an illustration of the efficiency gain from sequential sampling using the surrogate model.

FIG. 5 illustrates an Easom benchmark test function, which provides an illustration of the efficiency gain from sequential sampling using the surrogate model. Assuming that the bottom two axes represent input and the vertical axis represents an output for which we want to construct an adequate surrogate or regression model. Given that the response surface is largely flat and uninteresting, one would not want to waste too many samples in this region, besides doing so to ensure coarse coverage of the range of the inputs. Conversely, the interesting region in the response surface with the spike warrants drawing more samples to help capture the complexity adequately. A uniform sampling methodology like a space filling design coupled with the ability to only draw a few samples will likely not respect that requirement and will potentially over-sample the largely uninteresting region at the expense of under-sampling the interesting region.

Returning now to the method 600 in FIG. 3, the following steps or operations may be repeated sequentially (by performing multiple iterations) until a predetermined condition is satisfied. At 610, a modified trial schedule is selected. The modified trial schedule is based on the initial resource output data and the initial trial schedules and, if available, prior modified trial schedules and prior modified resource output data from prior iterations. In an embodiment, the modified trial schedule is selected by the schedule generator 102 using the surrogate model. For example, the modified trial schedule may be selected by evaluating the current surrogate model and selecting the next modified trial schedule based on one or more criteria. For example, at least a plurality of the modified trial schedules may be selected based on the underlying problem or goal for which the schedules are being evaluated, which may be improving one or more metrics-of-interest such as increasing cumulative resource output over the lifetime of the well pad. For example, the surrogate model can represent a set of functions plotted in a sample space. In an embodiment in which the metric-of-interest is increased resource output, the values of the parameters in the modified trial schedule may be selected in regions of the sample space where a mean value of the Gaussian regression is high, representing locations where the resource production levels may be greater than other locations having lower mean values. Alternatively, or in addition, the values of the parameters of the modified trial schedule may be selected, at least in part, to reduce uncertainty in the sample space.

At 612, modified resource output data is received. The modified resource output data is generated by the modified trial schedules being executed (or evaluated) by the reservoir simulation model 103 (shown in FIG. 1), similar to the evaluations of the initial trial schedules. The modified resource output data for a trial schedule may include, for example, an amount of the resource fluid expected to be extracted by implementing the respective modified trial schedule. The modified resource output data may be similar to the initial resource output data associated with the initial trial schedules. Like the evaluation of the initial trial schedules, the modified trial schedules may be simulated by the reservoir model on-site or remotely. At 614, the surrogate model is updated with the modified resource output data and the modified trial schedule from the current iteration. Therefore, the surrogate model is continually updated to reflect the information gleaned from the evaluations of the initial trial schedules and all previous evaluations of the modified trial schedules.

At step 616, the method 600 queries whether a predetermined condition has been satisfied. If the predetermined condition has not been satisfied, another iteration may be performed, so flow of the method returns to 610 for selecting another modified trial schedule. Various predetermined conditions (or a combination thereof) may be used. The predetermined condition may relate to time or achieving a desired outcome for one or more metrics-of-interest. For example, the predetermined condition may be satisfied when at least one of: (a) a predetermined time elapses; (b) a metric-of-interest obtained by one of the trial schedules passes a threshold value; (c) respective values of a metric-of-interest that are obtained by the last (e.g., previous) two trial schedules differ by less than a designated threshold value; or (d) a designated number of iterations have been performed (e.g., a designated number of trial schedules have been evaluated in the reservoir model). The schedule generator 102 or the central controller 104 may determine whether the predetermined condition is satisfied at step 616. Optionally, the predetermined condition is satisfied when at least two of the listed scenarios occur, instead of just one. For example, if the respective values of a metric-of-interest that are obtained by two successive trial schedules differ by less than a designated threshold value, the predetermined condition is not satisfied until at least one of a predetermined time elapses, a metric-of-interest obtained by one of the trial schedules passes a threshold value, or a designated number of iterations have been performed.

With respect to (a) above, the predetermined time may be minutes, hours, days, or weeks after starting the method 600. For example, the method 600 may be run for a week and the preferred trial schedule at that time (e.g., the trial schedule that achieves the greatest amount of resource extracted, the greatest NPV, or that maximizes a cost function based on multiple metrics relative to the other evaluated trial schedules) may be designated as the work schedule. With respect to (b), the metric of interest may be cumulative amount of the resource extracted, NPV, water utilization, or the like. When a threshold value for the metric-of-interest has been passed, the trial schedule at that iteration may be designated as the work schedule. With respect to (c), the threshold value may be percentage-based, such as 1%, 3%, 5%, or the like. If the variance in the metric-of-interest (as determined based on the resource output data) between the last two (or more) evaluations is less than the threshold value, then the last or the second from last trial schedule is designated at the work schedule. With respect to (d), the total number of iterations (and trial schedules) may be, for example, less than 60, less than 40, less than 20, or less than 10.

Optionally, operator judgment may be requested or required when determining whether the predetermined condition has been satisfied. For example, after the schedule generator 102 or central controller 104 determines that a specified predetermine condition has been satisfied, an operator may be notified and prompted, such as via the output device 108 (shown in FIG. 1). The operator may use the input device 106 to verify that the predetermined condition is satisfied or to alternatively deny that the predetermined condition is satisfied. In response to the latter, the method 600 may return to 610 for selecting another modified trial schedule. Optionally, the operator may be able to stop the performance of the iterations prior to one of the designated predetermined conditions being satisfied. For example, the operator may use the input device 106 to stop the flow of the method 600 and/or select one of the modified trial schedules prior to the schedule generator 102 or the central controller 104 determining that the predetermined condition is satisfied.

At 618, the work schedule is generated and may be used by embodiments to extract the resource from the reservoir. The work schedule may be, for example, one or more of the trial schedules (e.g., one of the two last modified trial schedules).

Returning now to FIG. 2, at 208, the work schedule is implemented to extract the hydrocarbon resource from the reservoir. The work schedule includes specific designated values for the various resource extraction parameters. The central controller 104 may implement the work schedule by communicating the designated values of the parameters to appropriate components (e.g., the pumps 116, 118 shown in FIG. 1) of the system 100 and/or to one or more operators. The central controller 104 may communicate with the operator via the output device 108 shown in FIG. 1 or by communicating a message remotely to a client computing device of the operator. Since the work schedule covers multiple phases of the resource extraction process, implementing the work schedule may include drilling wells in the reservoir area, stimulating the wells using a fracturing fluid, and extracting the resource from the wells.

At 210, resource production results are monitored. The resource production results may be monitored by measuring: (i) the flow rate of natural gas extracted from the wellbores, (ii) the cumulative amount of natural gas extracted from the wellbores, (iii) the pressure differential within the wellbores, (iv) the amount of fracturing fluid used and the amount remaining in supply, (v) the amount of energy used to create artificial lift, and the like. The monitoring may be accomplished using sensors that communicate sensor data to the central controller 104 for analysis. At 212, it is determined whether the results are valid, which is used to determine whether or not to revise the work schedule. For example, if one of the parameters monitored during production, such as the flow rate of natural gas, differs by more than a tolerance window (such as 1%, 3%, or 5%) from the expected value of that parameter as simulated in the reservoir simulation model 103 and described in the resource output data, then the results are not valid and the work schedule should be revised. In such a situation, the flow returns to 206 and the optimization workflow (e.g., the method 600) is performed again using an updated reservoir model and the information that is known in order to generate a revised work schedule for controlling resource extraction throughout the remainder of the operational lifetime of the well pad. If, on the other hand, the monitored data is within a designated tolerance window of the expected data, then flow may continue to 214.

At 214, it is determined whether to drill infill wellbores in the well pad. At 216, it is determined whether to refracture the wellbores. At 218, it is determined whether to perform enhanced oil recovery (EOR), such as by injecting a pressurized gas into the wellbores. The techniques in steps 214, 216, and 218 may be used to increase the amount of resource extracted from the reservoir over the lifetime of the well pad. In one embodiment, the initial optimization workflow in step 206, which is described in detail in the method 600 of FIG. 3, is performed for a greenfield reservoir area. The work schedule generated in 208 does not account for the post-production techniques of infilling, refracturing, or EOR. Therefore, after the resource has been produced for a period of time, such as a few months, it may be determined at steps 214, 216, and 218, whether to perform any such post-production techniques. Optionally, an operator may select, by using the input device 106, whether to perform infilling, refracturing, and/or EOR. Alternatively, the central controller 104 or another computing device may determine whether to perform such techniques based, for example, on determining that the monitored resource production results are less than expected or desired.

At 214, if it is determined that drilling infill wellbores is desirable, then flow of the method 200 returns to 206 and the optimization workflow is performed again to generate a revised work schedule that includes drilling infill wellbores. For example, the well creation parameters will include the time to begin drilling infill wells, the time period between drilling such wells, and the sequence at which the infill wells are drilled (e.g., running, middle-out, out-middle). At 216, if it is determined that refracturing the wellbores is desirable, then flow of the method 200 returns to 206 and the optimization workflow is performed again to generate a revised work schedule that includes introducing additional fracturing fluid into the wellbores to create additional fractures or to enlarge existing fractures. The well stimulation parameters will include the amount and flow rate that the fracturing fluid is injected into the wellbores and the fracture design. At 218, if it is determined that EOR is desirable, then flow of the method 200 returns to 206 and the optimization workflow is performed again to generate a revised work schedule that includes introducing pressurized gas into the wellbores. The well stimulation parameters will include the type of gas, the time to introduce the gas into the wells (after the production start date), the amount, flow rate, and/or pressure of the gas that is introduced into the wells, and the like.

In an alternative embodiment, the initial performance of the optimization workflow at 206 may account for any post-production techniques, such as infilling, refracturing, and EOR. Therefore, such parameters are considered during the generation of the first work schedule. Implementing the work schedule at 208 may include performing one or more of these post-production techniques at designated times during the operational lifetime of the well pad.

FIG. 6 is a table 300 showing multiple parameters used to generate a work schedule according to a working example of the method 600. The working example includes the creation and stimulation of infill wells to enhance one or more metrics-of-interest, such as cumulative resource extraction, over the operational lifetime of a well pad. The parameters investigated include the total number of wells, the time to begin drilling infill wells, the time between drilling infill wells, the sequence at which the infill wells are drilled, the number of stages in each well, the fracture design, the bottom hole flowing pressure (BHFP) upper limit (e.g. max), the BHFP lower limit (e.g., min), the BHFP step rate between pressure adjustments, and the family of the curve to taper the BHFP. Some of the parameters have a lower limit ("min") and an upper limit ("max") which allows the schedule generator 102 shown in FIG. 1 to select values of the parameters within the designated limits for evaluating and comparing the different trial schedules. For example, the number of stages has a lower limit of 20 and an upper limit of 50. The number of wells has a lower limit of one and an upper limit of 7. Other parameters have a small, discrete number of alternative options, such that the fracture design includes three different fracture half-lengths of 500, 1000, and 1500 ft and the infilling sequence is either running, out-middle, or middle-out.

Figure 7:
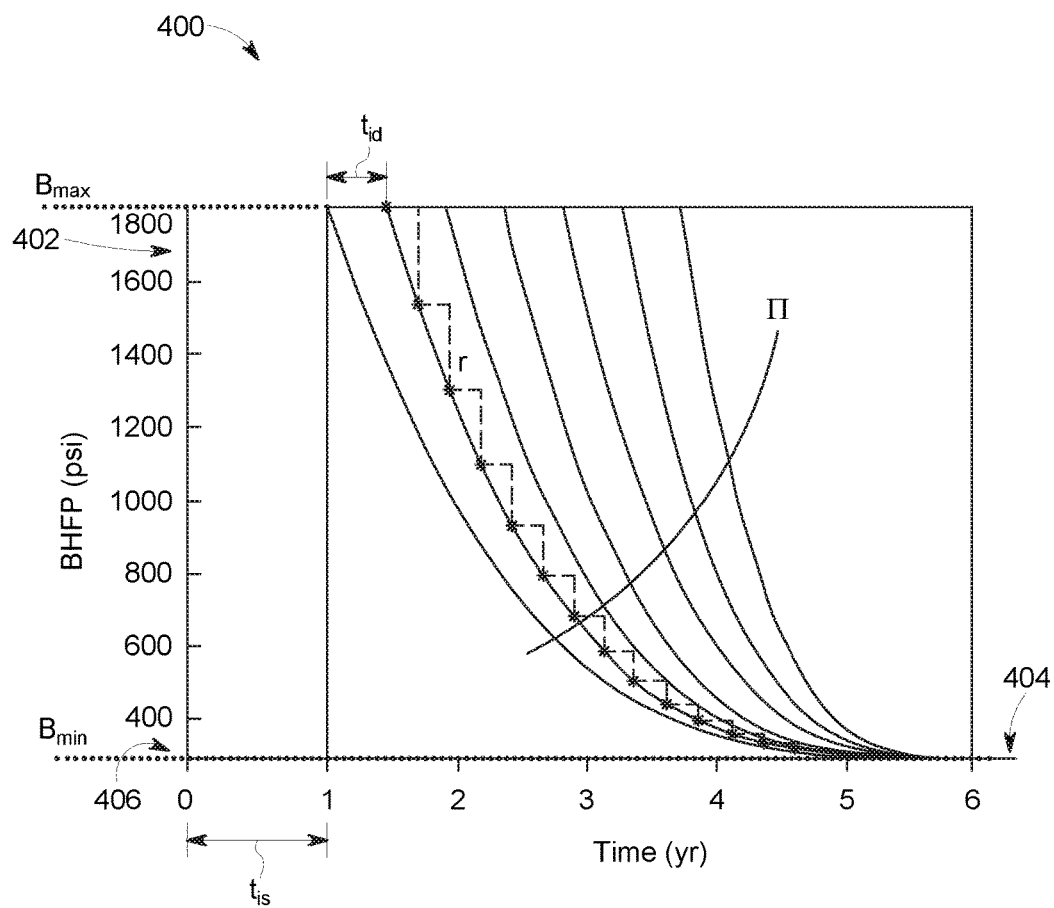
FIG. 7 is a graph plotting bottom hole flowing pressure over time according to the working example of FIG. 6.

FIG. 7 is a graph 400 showing parameters used in the working example according to an embodiment. For example, the graph 400 plots the schedule for bottom hole flowing pressure (BHFP) (shown on the y-axis 402) over time (shown on the x-axis 404), which is part of the extraction schedule during the production phase. The BHFP extends from the BHFP lower limit (shown as $B_{min}$) to the BHFP upper limit (shown as $B_{max}$). The time extends for a period of years, such as 6 years starting from a production start time at the origin 406. The time to start drilling infill wells is represented on the graph 400 as tis, and is between zero and 365 days (e.g., 1 year). The time between drilling the infill wells is represented on the graph 400 as $t_{id}$, and is between zero and 90 days. The BHFP step rate is represented as r, and is between four and 90 days. The BHFP upper limit is 3500 psi in the graph 400, but may be greater or lesser in other embodiments. The BHFP lower limit is 300 psi in the graph 400, but may be a greater or lesser pressure in other embodiments. The family of the BHFP taper curve is shown as multiple plotted curves in the graph 400. The acceptable range of the family of taper curves is between 0.0 and 4.0, as shown in the table 300.

Based on the resource extraction parameters (e.g., constraints) shown in FIGS. 6 and 7, the method 600 was performed. For example, ten initial trial schedules were selected (e.g., by the schedule generator 102) that have different values of these parameters. The initial trial schedules were evaluated in the reservoir simulation model 103 to obtain resource production data associated with each trial schedule. Then, a surrogate model was generated using the initial trial schedules and the resource production data. The surrogate model was used to select modified trial schedules iteratively, based on a goal of increasing NPV. The modified trial schedules were evaluated on the reservoir simulation model to obtain modified resource production data. The surrogate model was updated after each iteration to include the information from the preceding modified trial schedule and resource production data. In the working example, ten iterations were performed (e.g., ten modified trial schedules were selected) prior to a predetermined condition being satisfied. Therefore, twenty total evaluations in the reservoir simulation model were performed. In the working example, the modified trial schedule selected as the work schedule had a BHFP from 300 psi to 1921 psi, a BHFP step rate of 66 days between adjustments, 48 stages per well, a fracture half-length of 1000 ft, six infill wells, and a time between infills of zero days. The work schedule selected is the schedule that produced the greatest NPV relative to the other schedules evaluated.

Figure 8:
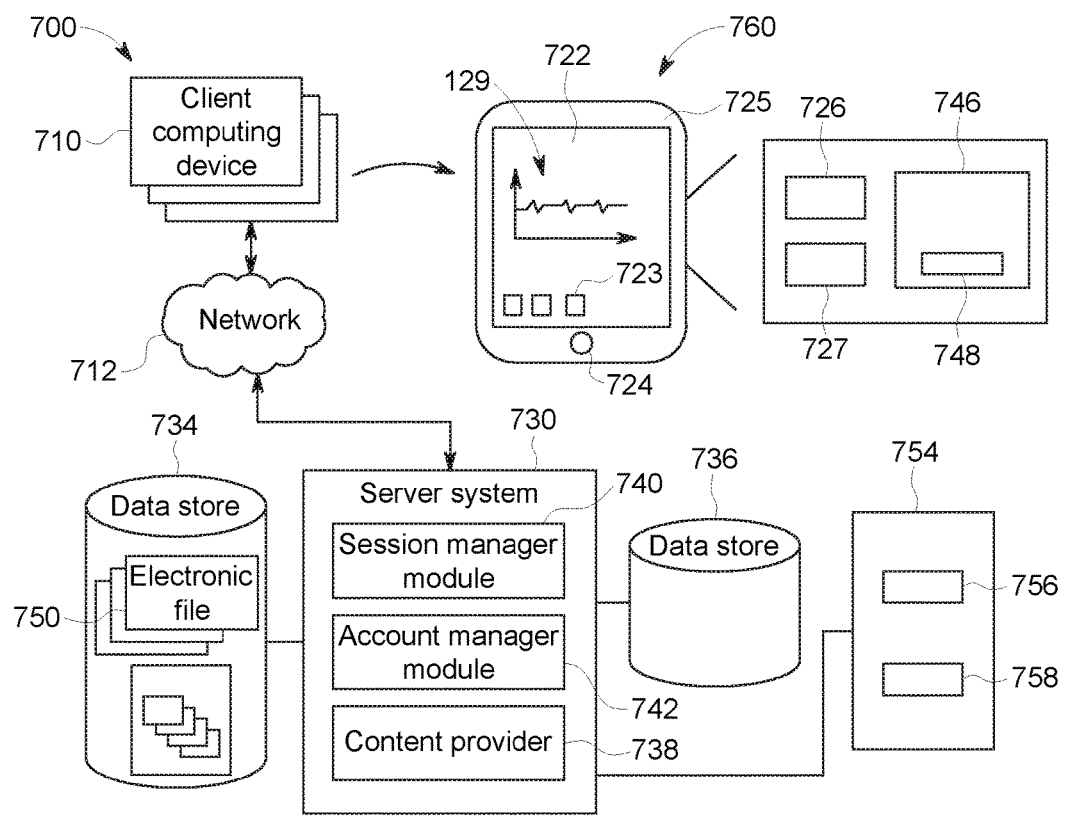
FIG. 8 illustrates a block diagram of a communication system in accordance with an embodiment.

FIG. 8 is a block diagram of a communication system 700 in accordance with an embodiment. The communication system 700 may be used to perform at least a portion of one or more of the methods described herein. For example, the communication system 700 may be configured to allow remote operators to view a work schedule for a hydraulic fracturing-based resource extraction operation, and may also allow the operator to monitor the progress of the resource extraction operation over time.

The communication system 700 includes one or more client computing devices 710 that are capable of communicating over a network 712 with a server system 730. The server system 730 may include one or more web servers and, optionally, one or more application servers. The server system 730 may host a web application and have the tools, application program interfaces (APIs), and scripts, among other things, that are used for the web application. In some embodiments, a web application includes a web site or web page that allows a user to view waveform data. The server system 730 may be only a single server or include a plurality of different servers that communicate with one another and the client computing devices 710 over the network 712. The server system 730, in some embodiments, is configured to receive and interpret requests through the network 712 from the client computing devices 710 or, more specifically, from software applications 746 of the client computing devices 710. The server system 730 is also configured to respond to the requests and transmit data to the client computing devices 710 in a predetermined format (e.g., HTML format). In some cases, the server system 730 and the client computing devices 710 may form a cloud-type computing system (e.g., public cloud, private cloud, or hybrid cloud).

The network 712 represents any one or combination of multiple different types of networks, such as cable networks, the Internet, private intranets, local area networks, wide area networks, wireless networks, and the like. In particular embodiments, the network 712 is the network of an enterprise (e.g., business) that allows access to authorized users for communicating confidential information for receiving work schedules.

The client computing devices 710 may be implemented as any number of types of computing devices. These devices may include, for instance, personal computers (PCs), tablet computers, notebook computers, laptop computers, smart phones, wearable computers (e.g., smart watches), electronic book readers, and so forth. In particular embodiments, the client computing devices 710 may include portable or handheld mobile devices, such as tablet computers, notebook computers, laptop computers, and smart phones, carried by operators. The client computing devices 710 may also be configured to operate application programs, such as web browsers, mobile applications, or other software programs. Application programs may be third-party software that retrieve, present, and communicate information through the network. Application programs are configured to communicate with the server system 730 over the network 712. Embodiments set forth herein may be implemented, at least in part, using an application program, a sub-application associated with the application program, or other software program having computer executable code.

In some embodiments, the server system 730 is configured to present a site (e.g., a website) that is capable of handling requests from one or more users and transmitting, in response, various pages (e.g., web pages) that are rendered at the client computing devices 710. For instance, the site can be any type of site that allows a user to view work schedules, graphs, etc. and, optionally, supports user interaction. In another example, the server system 730 may provide applications or sub-applications for the client computing devices 710 to download, store, and run locally. The server system 730 may additionally or alternatively interact with the client computing devices 710 to provide content in other ways. As one example, the server system 730 may present an institutional website that allows access to data for a user that is authorized to view the data. The server system 730 may include, among other things, a content provider module 738, a session manager module 740, and an account manager module 742. The modules 738, 740 and 742, as well as other modules or services described herein, may be implemented by one or more processors performing program instructions to perform the operations described herein. The program instructions may be stored in data stores 734 or 736. The server system 730 interacts with one or more memories or data stores 734 and 736 in various manners. One or both of the memories or data stores 734 and 736 may store program instructions to direct one or more processors to carry out the instructions described herein.

The data stores 734, 736 (as well as memory at the client computing devices 710) may also store various information, such as account-specific information about users of the site, web content, and/or electronic files 750 (e.g., work or trial schedules, reservoir data, reservoir extraction parameters, etc.). The data store 734 may also store one or more catalogs related to items that may be viewed by the user. It is recognized that the various content may be stored at locations distributed between various data storage areas, geographic locations, file structures, recommendation services, e-commerce catalogs and the like.

During operation, the session manager module 740 maintains network sessions with one or more client computing devices 710, which may be associated with the same enterprise or multiple different enterprises. The session manager module 740 responds to requests from the client computing devices 710 by providing authenticated and unauthenticated network resources. The session manager module 740 reviews incoming requests and determines whether the incoming requests seek access to authenticated or unauthenticated network resources. Requests for an authenticated network resource involve (e.g., require) privilege authentication before the session manager module 740 grants access to the authenticated network resource. When privilege authentication is warranted/needed, the account manager module 742 returns an account lookup response including a prompt for sign-in credentials. Optionally, the account manager module 742 may return an account authentication page including at least one of i) a sign-in credential fields or ii) a create new account option. Based on the user's entries at the account authentication page (as explained herein), the account manager module 742 the presents an account lookup response (e.g., when incorrect sign-in credentials are entered). The account manager module 742 may authorize the user to view the resource extraction work schedule, other trial schedules, reservoir data (e.g., cumulative natural gas extraction to date or current natural gas flow rate), and/or other information.

The system 700 also includes a computer 760 (e.g., tablet computer, but other computers may be used) that includes a user display 722, which may be a touchscreen in some embodiments that is configured to identify and locate a touch from a user's finger or stylus. The computer 760 optionally may be one of the client computing devices 710. The user display 722 is framed by a housing 725 of the computer 760. The user display 722 defines an area that may present virtual user-selectable elements 723 that may be selected by the user on the user display 722. Alternatively or in addition to the user-selectable elements 723, a user may select tangible or physical user-selectable elements 724 (e.g., buttons, switches, and the like). The computer 760 may include one or more processors 726 and computer-readable storage media 727. The computer-readable storage media 727 may store program instructions or computer code for a display application 746. In some embodiments, the computer-readable storage media 727 may store programmed instructions or computer code for a sub-application 748. Optionally, the sub-application 748 may be a plug-in or extension that is executable within or by the display application 746.

The system 700 also includes a schedule generator 754 that is configured to generate the work schedule for hydraulic fracturing-based resource extraction. The schedule generator 754 may be the schedule generator 102 shown in FIG. 1. As shown, the schedule generator 754 includes one or more processors 756 (e.g., microprocessors, field programmable gate arrays, application specific integrated circuits, multi-core processors, or other electronic circuitry or logic-based devices that carry out instructions of a computer program by carrying out arithmetic, logical, control, and/or input/output operations specified by the instructions) and a tangible and non-transitory computer readable storage medium 758. The tangible and non-transitory computer readable storage medium 758 may include one or more programmed instructions or may include one or more software modules configured to direct the one or more processors 756. The one or more processors 756 may be configured to execute the programmed instructions and perform one or more of the operations and/or steps of the methods set forth herein (e.g., the method 600 shown in FIG. 3).

To illustrate an example, the schedule generator 754 may obtain resource extraction parameters from a client computing device 710. The schedule generator 754 may select the set of initial trial schedules. The initial trial schedules have different values of the resource extraction parameters for multiple phases of the resource extraction, including well creation, well stimulation by providing the fracturing fluid, and resource production. The schedule generator 754 may communicate the initial trial schedules to the client computing devices 710 (or computer 760). The client computing devices 710 may have a reservoir model (e.g., the reservoir simulation model 103 shown in FIG. 1) stored thereon and an application that runs the initial trial schedules using the reservoir model, thereby generating initial resource output data. The client computing device 710 communicates the initial resource output data to the server system 730 and the schedule generator 754. The schedule generator 754 may generate a surrogate model based on the initial resource output data and the initial trial schedules.

The schedule generator 754 is configured to perform iterations of the following until a predetermined condition is satisfied. The schedule generator 754 uses the surrogate model to select a modified trial schedule and then communicates the modified trial schedule to the client computing device 710. The modified trial schedule is selected based on the initial resource output data and the initial trial schedules and, if available, prior modified trial schedules and prior modified resource output data from prior iterations. The client computing devices 710 may run the modified trial schedule using the reservoir model stored on the client computing device 710, thereby generating modified resource output data. The client computing device 710 communicates the modified resource output data to the server system 730 and the schedule generator 754. The schedule generator 754 receives the modified resource output data and generates an updated surrogate model that is based on the initial resource output data, the initial trial schedules, the modified resource output data, and the modified trial schedules from the prior iterations.

After the predetermined condition is satisfied, the schedule generator 754 may communicate a work schedule to the client computing device 710. The work schedule may be one or more of the modified trial schedules or a function of one of the modified trial schedules. The work schedule may be the last or second-to-last modified trial schedule.

Although the above example illustrates certain operations being performed by the client computing device 710 and certain operations being performed by the schedule generator 754, it should be understood that other operations may be performed by the client computing device 710 and the schedule generator 754, or that the client computing device 710 and the schedule generator 754 perform different operations. For example, the schedule generator 754 may perform all of the operations of the method 600 shown in FIG. 3. Alternatively, one or more of the client computing devices 710 may perform all of the operations of the method 600.

In an embodiment, a system is provided that includes a schedule generator. The schedule generator includes one or more processors configured to obtain resource extraction parameters for extracting a resource from a reservoir. The resource extraction parameters include well creation parameters associated with drilling wellbores in the reservoir, well stimulation parameters associated with introducing fracturing fluid into the wellbores to create fractures in the reservoir emanating from the wellbores, and production parameters associated with controlling extraction of the resource from the reservoir through the wellbores. The schedule generator is configured to select multiple initial trial schedules that include different values of the resource extraction parameters and receive initial resource output data that is generated by execution of the initial trial schedules with a designated model of the reservoir. The schedule generator is further configured to generate a surrogate model based on the initial resource output data and the initial trial schedules and use the surrogate model to perform multiple iterations of selecting a modified trial schedule until a predetermined condition is satisfied. The schedule generator receives modified resource output data generated by execution of the modified trial schedule with the designated model of the reservoir. The modified trial schedule for each iteration is selected based on the initial resource output data, the initial trial schedules, and, if available, prior modified trial schedules and prior modified resource output data.

Optionally, the schedule generator is configured to select the initial trial schedules such that the initial trial schedules are evenly distributed with respect to one another in a sample space. The schedule generator is configured to use the surrogate model to select the modified trial schedule for each iteration using active learning techniques from machine learning.

Optionally, the schedule generator is configured to update the surrogate model after each iteration with the modified trial schedule and the modified resource output data that is based on the modified trial schedule.

Optionally, the well creation parameters include at least one of a number of the wellbores in the reservoir, locations of the wellbores, a separation distance between the wellbores, a time to begin drilling infill wellbores after starting extraction of the resource from the reservoir, or a time period between drilling the infill wellbores.

Optionally, the well stimulation parameters include at least one of a number of stages in the wellbores, a separation distance between the stages in each of the wellbores, a composition of the fracturing fluid, a fracture length, a fracture conductivity, a flow rate of the fracturing fluid into the wellbores, or a pressure at which the fracturing fluid is introduced into the wellbores.

Optionally, the production parameters include at least one of a bottom hole flowing pressure upper limit, a bottom hole flowing pressure lower limit, a bottom hole flowing pressure adjustment rate, or a bottom hole flowing pressure taper curve.

Optionally, the schedule generator is further configured to control one or more of a pump or a choke operably coupled to one of the wellbores to provide a bottom hole flowing pressure in the wellbore according to the production parameters in the modified trial schedule that was selected when the predetermined condition was satisfied.

Optionally, the well creation parameters include at least one of a time to begin drilling infill wellbores in the reservoir after starting extraction of the resource from the reservoir, a sequence at which to drill the infill wellbores, or a time period between drilling the infill wellbores. Locations of the infill wellbores are based on locations of existing wellbores in the reservoir.

Optionally, the schedule generator is configured to use the surrogate model to select the modified trial schedules of the iterations to increase one or more of an amount of the resource extracted from the reservoir or a net present value of extracting the resource from the reservoir.

Optionally, the predetermined condition is satisfied when at least one of: (a) a predetermined time elapses; (b) a metric-of-interest obtained in the modified resource output data passes a threshold value; (c) respective values of a metric-of-interest obtained in the modified resource output data of the last two iterations differ by less than a designated threshold value; or (d) a designated number of iterations have been performed.

Optionally, the well stimulation parameters include a time, subsequent to starting extraction of the resource from the reservoir, to at least one of re-introduce a fracturing fluid under pressure into the wellbores or introduce a gas under pressure into the wellbores to enhance the extraction of the resource from the reservoir.

In another embodiment, a method is provided that includes obtaining resource extraction parameters for extracting a resource from a reservoir. The resource extraction parameters include well creation parameters associated with drilling wellbores in the reservoir, well stimulation parameters associated with introducing fracturing fluid into the wellbores to create fractures in the reservoir emanating from the wellbores, and production parameters associated with controlling extraction of the resource from the reservoir through the wellbores. The method further includes selecting a set of initial trial schedules that include different values of the resource extraction parameters, receiving initial resource output data that is generated by execution of the initial trial schedules with a designated model of the reservoir, generating a surrogate model based on the initial resource output data and the initial trial schedules, and performing a plurality of iterations of the following until a predetermined condition is satisfied. The iterations include selecting, using the surrogate model, a modified trial schedule based on the initial resource output data and the initial trial schedules and, if available, prior modified trial schedules and prior modified resource output data from prior iterations. The iterations further include receiving modified resource output data that is generated by execution of the modified trial schedule using the designated model of the reservoir, and updating the surrogate model with the modified resource output data and the modified trial schedule.

Optionally, the initial trial schedules are selected such that the initial trial schedules are distributed with respect to one another in a sample space. The modified trial schedule for each iteration is selected using the surrogate model by employing active learning techniques from machine learning.

Optionally, the method further includes extracting the resource from the reservoir according to the values of the resource extraction parameters in the last modified trial schedule that was selected when the predetermined condition was satisfied.

Optionally, the method further includes extracting the resource from the reservoir according to the resource extraction parameters in the modified trial schedule that is associated with a greater net present value of extracting the resource from the reservoir relative to the other modified trial schedules.

Optionally, the well creation parameters include at least one of a number of the wellbores in the reservoir, locations of the wellbores, a separation distance between the wellbores, a time to begin drilling infill wellbores after starting extraction of the resource from the reservoir, or a time period between drilling the infill wellbores.

Optionally, the well stimulation parameters include at least one of a number of stages in the wellbores, a separation distance between the stages in each of the wellbores, a composition of the fracturing fluid, a fracture length, a fracture conductivity, a flow rate of the fracturing fluid into the wellbores, or a pressure at which the fracturing fluid is introduced into the wellbores.

Optionally, the well stimulation parameters include a time, subsequent to starting extraction of the resource from the reservoir, to at least one of re-introduce a fracturing fluid under pressure into the wellbores or introduce a gas under pressure into the wellbores to enhance the extraction of the resource from the reservoir.

In another embodiment, a system is provided that includes a schedule generator and a central controller. The schedule generator includes one or more processors configured to perform multiple iterations of selecting a trial schedule for extracting a resource from a reservoir and obtaining resource output data that is generated by evaluating the trial schedule in a designated model of a reservoir. The trial schedules of the multiple iterations include different values of resource extraction parameters associated with drilling wellbores in the reservoir, introducing a fracturing fluid into the wellbores, and controlling extraction of the resource from the reservoir through the wellbores. The schedule generator is configured to select the values of the resource extraction parameters for the trial schedule of each subsequent iteration using a surrogate model. The surrogate model includes the trial schedules and resource output data of prior iterations. The schedule generator is configured to perform the multiple iterations until a predetermined condition is satisfied to identify a work schedule. The resource output data is associated with work schedule having an improved metric-of-interest relative to the resource output data associated with the other trial schedules that are evaluated. The central controller includes one or more processors configured to control introduction of the fracturing fluid into the wellbores of the reservoir according to the values of the resource extraction parameters in the work schedule.

Optionally, the resource extraction parameters include at least one of a number of stages in the wellbores, a separation distance between the stages in each of the wellbores, a composition of the fracturing fluid, a fracture length, a fracture conductivity, a flow rate of the fracturing fluid into the wellbores, or a pressure at which the fracturing fluid is introduced into the wellbores.

Optionally, the metric-of-interest is at least one of a net present value of extracting the resource from the reservoir or an amount of the resource extracted from the reservoir.

Optionally, the resource extraction parameters include a time, subsequent to starting extraction of the resource from the reservoir, to at least one of re-introduce a fracturing fluid under pressure into the wellbores or introduce a gas under pressure into the wellbores to enhance the extraction of the resource from the reservoir.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. For example, a module or system may include a computer processor, controller, or other logic-based device that performs operations based on instructions stored on a tangible and non-transitory computer readable storage medium, such as a computer memory. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

It is to be understood that the above description is intended to be illustrative, and not restrictive. For example, the above-described embodiments (and/or aspects thereof)

may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
a schedule generator including one or more processors configured to obtain resource extraction parameters for extracting a resource from a reservoir, the resource extraction parameters including well creation parameters associated with drilling wellbores in the reservoir, well stimulation parameters associated with introducing fracturing fluid into the wellbores to create fractures in the reservoir emanating from the wellbores, and production parameters associated with controlling extraction of the resource from the reservoir through the wellbores,
the schedule generator configured to select multiple initial trial schedules that include different values of the resource extraction parameters and receive initial resource output data that is generated by execution of the initial trial schedules with a designated model of the reservoir,
the schedule generator further configured to generate a surrogate model based on the initial resource output data and the initial trial schedules and use the surrogate model to perform multiple iterations of selecting a modified trial schedule until a predetermined condition is satisfied,
wherein the schedule generator receives modified resource output data generated by execution of the modified trial schedule with the designated model of the reservoir, the modified trial schedule for each iteration selected based on the initial resource output data, the initial trial schedules, and, if available, prior modified trial schedules and prior modified resource output data,
wherein the production parameters include at least one of a bottom hole flowing pressure upper limit, a bottom hole flowing pressure lower limit, a bottom hole flowing pressure adjustment rate, or a bottom hole flowing pressure taper curve,
wherein the schedule generator is further configured to control one or more of a pump or a choke operably coupled to one of the wellbores to provide a bottom hole flowing pressure in the wellbore according to the production parameters in the modified trial schedule that was selected when the predetermined condition was satisfied.

2. The system of claim 1, wherein the schedule generator is configured to select the initial trial schedules such that the initial trial schedules are evenly distributed with respect to one another in a sample space, the schedule generator configured to use the surrogate model to select the modified trial schedule for each iteration using active learning techniques from machine learning.

3. The system of claim 1, wherein the schedule generator is configured to update the surrogate model after each iteration with the modified trial schedule and the modified resource output data that is based on the modified trial schedule.

4. The system of claim 1, wherein the well creation parameters include at least one of a number of the wellbores in the reservoir, locations of the wellbores, a separation distance between the wellbores, a time to begin drilling infill wellbores after starting extraction of the resource from the reservoir, or a time period between drilling the infill wellbores.

5. The system of claim 1, wherein the well stimulation parameters include at least one of a number of stages in the wellbores, a separation distance between the stages in each of the wellbores, a composition of the fracturing fluid, a fracture length, a fracture conductivity, a flow rate of the fracturing fluid into the wellbores, or a pressure at which the fracturing fluid is introduced into the wellbores.

6. The system of claim 1, wherein the well creation parameters include at least one of a time to begin drilling infill wellbores in the reservoir after starting extraction of the resource from the reservoir, a sequence at which to drill the infill wellbores, or a time period between drilling the infill wellbores, wherein locations of the infill wellbores are based on locations of existing wellbores in the reservoir.

7. The system of claim 1, wherein the schedule generator is configured to use the surrogate model to select the modified trial schedules of the iterations to increase one or more of an amount of the resource extracted from the reservoir or a net present value of extracting the resource from the reservoir.

8. The system of claim 1, wherein the predetermined condition is satisfied when at least one of: (a) a predetermined time elapses; (b) a metric-of-interest obtained in the modified resource output data passes a threshold value; (c) respective values of a metric-of-interest obtained in the modified resource output data of the last two iterations differ by less than a designated threshold value; or (d) a designated number of iterations have been performed.

9. The system of claim 1, wherein the well stimulation parameters include a time, subsequent to starting extraction of the resource from the reservoir, to at least one of re-introduce a fracturing fluid under pressure into the wellbores or introduce a gas under pressure into the wellbores to enhance the extraction of the resource from the reservoir.

10. A method comprising:
obtaining resource extraction parameters for extracting a resource from a reservoir, the resource extraction parameters including well creation parameters associated with drilling wellbores in the reservoir, well stimulation parameters associated with introducing fracturing fluid into the wellbores to create fractures in the reservoir emanating from the wellbores, and production parameters associated with controlling extraction of the resource from the reservoir through the wellbores,
selecting a set of initial trial schedules that include different values of the resource extraction parameters;
receiving initial resource output data that is generated by execution of the initial trial schedules with a designated model of the reservoir;
generating a surrogate model based on the initial resource output data and the initial trial schedules; and
performing a plurality of iterations of the following until a predetermined condition is satisfied:
selecting, using the surrogate model, a modified trial schedule based on the initial resource output data and the initial trial schedules and, if available, prior modified trial schedules and prior modified resource output data from prior iterations;
receiving modified resource output data that is generated by execution of the modified trial schedule using the designated model of the reservoir;
updating the surrogate model with the modified resource output data and the modified trial schedule; and
controlling one or more of a pump or a choke operably coupled to one of the wellbores to provide a bottom hole flowing pressure in the wellbore according to the production parameters in the modified trial schedule that was selected when the predetermined condition was satisfied.

11. The method of claim 10, wherein the initial trial schedules are selected such that the initial trial schedules are distributed with respect to one another in a sample space, the modified trial schedule for each iteration selected using the surrogate model by employing active learning techniques from machine learning.

12. The method of claim 10, further comprising extracting the resource from the reservoir according to the values of the resource extraction parameters in the last modified trial schedule that was selected when the predetermined condition was satisfied.

13. The method of claim 10, further comprising extracting the resource from the reservoir according to the resource extraction parameters in the modified trial schedule that is associated with a greater net present value of extracting the resource from the reservoir relative to the other modified trial schedules.

14. The method of claim 10, wherein the well creation parameters include at least one of a number of the wellbores in the reservoir, locations of the wellbores, a separation distance between the wellbores, a time to start drilling infill wellbores after starting extraction of the resource from the reservoir, or a time period between drilling the infill wellbores.

15. The method of claim 10, wherein the well stimulation parameters include at least one of a number of stages in the wellbores, a separation distance between the stages in each of the wellbores, a composition of the fracturing fluid, a fracture length, a fracture conductivity, a flow rate of the fracturing fluid into the wellbores, or a pressure at which the fracturing fluid is introduced into the wellbores.

16. The method of claim 10, wherein the well stimulation parameters include a time, subsequent to starting extraction of the resource from the reservoir, to at least one of re-introduce a fracturing fluid under pressure into the wellbores or introduce a gas under pressure into the wellbores to enhance the extraction of the resource from the reservoir.

17. A system comprising:
a schedule generator including one or more processors configured to perform multiple iterations of selecting a trial schedule for extracting a resource from a reservoir and obtaining resource output data that is generated by evaluating the trial schedule in a designated model of a reservoir, the trial schedules of the multiple iterations including different values of resource extraction parameters associated with drilling wellbores in the reservoir, introducing a fracturing fluid into the wellbores, and controlling extraction of the resource from the reservoir through the wellbores based on production parameters,
wherein the schedule generator is configured to select the values of the resource extraction parameters for the trial schedule of each subsequent iteration using a surrogate model, the surrogate model including the trial schedules and resource output data of prior iterations,
wherein the schedule generator configured to perform the multiple iterations of selecting a modified trial schedule until a predetermined condition is satisfied to identify a work schedule, the resource output data associated with work schedule having an improved metric-of-interest relative to the resource output data associated with the other trial schedules that are evaluated,
wherein the schedule generator is further configured to control one or more of a pump or a choke operably coupled to one of the wellbores to provide a bottom hole flowing pressure in the wellbore according to the production parameters in the modified trial schedule that was selected when the predetermined condition was satisfied; and a central controller including one or more processors configured to control introduction of the fracturing fluid into the wellbores of the reservoir according to the values of the resource extraction parameters in the work schedule.

18. The system of claim 17, wherein the resource extraction parameters include at least one of a number of stages in the wellbores, a separation distance between the stages in each of the wellbores, a composition of the fracturing fluid, a fracture length, a fracture conductivity, a flow rate of the fracturing fluid into the wellbores, or a pressure at which the fracturing fluid is introduced into the wellbores.

19. The system of claim 17, wherein the metric-of-interest is at least one of a net present value of extracting the resource from the reservoir or an amount of the resource extracted from the reservoir.

20. The system of claim 17, wherein the resource extraction parameters include a time, subsequent to starting extraction of the resource from the reservoir, to at least one of re-introduce a fracturing fluid under pressure into the wellbores or introduce a gas under pressure into the wellbores to enhance the extraction of the resource from the reservoir.

* * * * *